United States Patent [19]

Inomata et al.

[11] Patent Number: 5,538,394
[45] Date of Patent: Jul. 23, 1996

[54] COOLED TURBINE BLADE FOR A GAS TURBINE

[75] Inventors: Asako Inomata; Hisashi Matsuda; Yoshitaka Fukuyama, all of Yokohama; Fumio Ohtomo, Zama; Yuji Nakata; Hideo Nomoto, both of Yokohama, all of Japan

[73] Assignee: Kabushiki Kaisha Toshiba, Kawasaki, Japan

[21] Appl. No.: 365,430

[22] Filed: Dec. 28, 1994

[30] Foreign Application Priority Data

Dec. 28, 1993 [JP] Japan ................... 5-335457

[51] Int. Cl.$^6$ .................................. F01D 5/18
[52] U.S. Cl. ........................... 416/97 R; 415/115
[58] Field of Search ................. 415/115; 416/96 R, 416/96 A, 97 R

[56] References Cited

U.S. PATENT DOCUMENTS

| 2,956,773 | 10/1960 | French . | |
|---|---|---|---|
| 4,515,526 | 5/1985 | Levengood | 416/97 R |
| 5,052,889 | 10/1991 | Abdel-Messeh | 416/97 R |
| 5,165,852 | 11/1992 | Lee et al. . | |
| 5,299,418 | 4/1994 | Kerrebrock | 416/96 R |
| 5,356,265 | 10/1994 | Kercher . | |
| 5,395,212 | 3/1995 | Anzai et al. | 415/115 |

FOREIGN PATENT DOCUMENTS

| 2672338 | 8/1992 | France . | |
|---|---|---|---|
| 60-101202 | 6/1985 | Japan . | |
| 5-10101 | 1/1993 | Japan . | |
| 5-17361 | 3/1993 | Japan . | |
| 5-263660 | 10/1993 | Japan . | |
| 1222565 | 2/1971 | United Kingdom | 416/97 R |

OTHER PUBLICATIONS

Patent Abstract of Japan, vol. 17, No. 282 (M–1420), May 31, 1993, JP–A–5010101, Jan. 19, 1993.
Patent Abstracts of Japan, vol. 9, No. 297 (M–432), Nov. 25, 1985, JP–A–60135606, Jul. 19, 1985.
Patent Abstract of Japan, vol. 10, No. 47 (M–456), Feb. 25, 1986, JP–A–60198305, Jul. 10, 1985.

*Primary Examiner*—Edward K. Look
*Assistant Examiner*—Christopher Verdier
*Attorney, Agent, or Firm*—Oblon, Spivak, McClelland, Maier & Neustadt

[57] ABSTRACT

A cooling flow passage assembly consisting of pressure side cooling flow passages extending in a span direction and suction side cooling flow passages extending in the span direction and serially connected to the pressure side cooling flow passages is formed in a turbine blade. A cooling medium flows through the pressure side cooling flow passages in the direction toward the tip portion and through the suction side cooling flow passages in the direction toward the root. Cooling effect is improved by a Coriolis force. The number of the suction side cooling flow passages is larger than the number of the pressure side cooling flow passages. At least one of the suction side cooling flow passages forms at least one most downstream cooling flow passage. The cooling medium flows through the most downstream cooling flow passage and is exhausted outside of the turbine blade through nozzles, whereby the flow of the cooling medium through the most downstream cooling flow passage is speeded up.

8 Claims, 15 Drawing Sheets

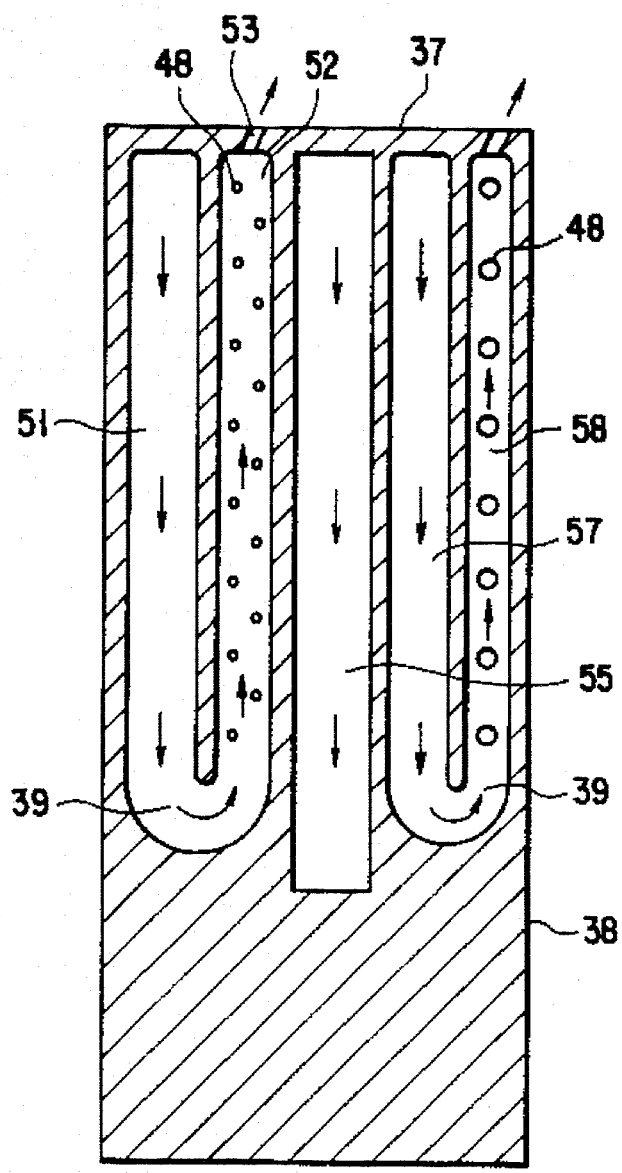
F I G. 2
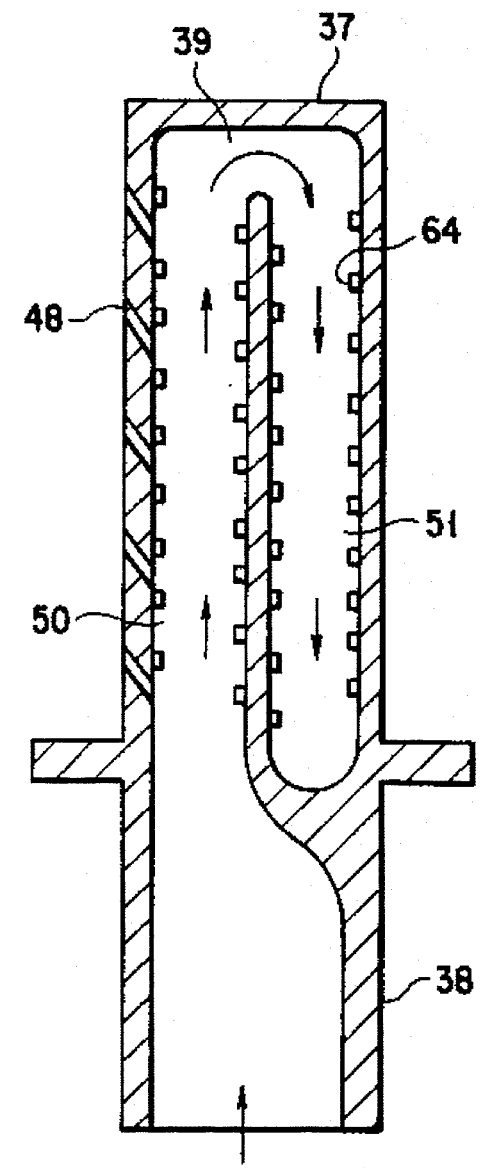
F I G. 3

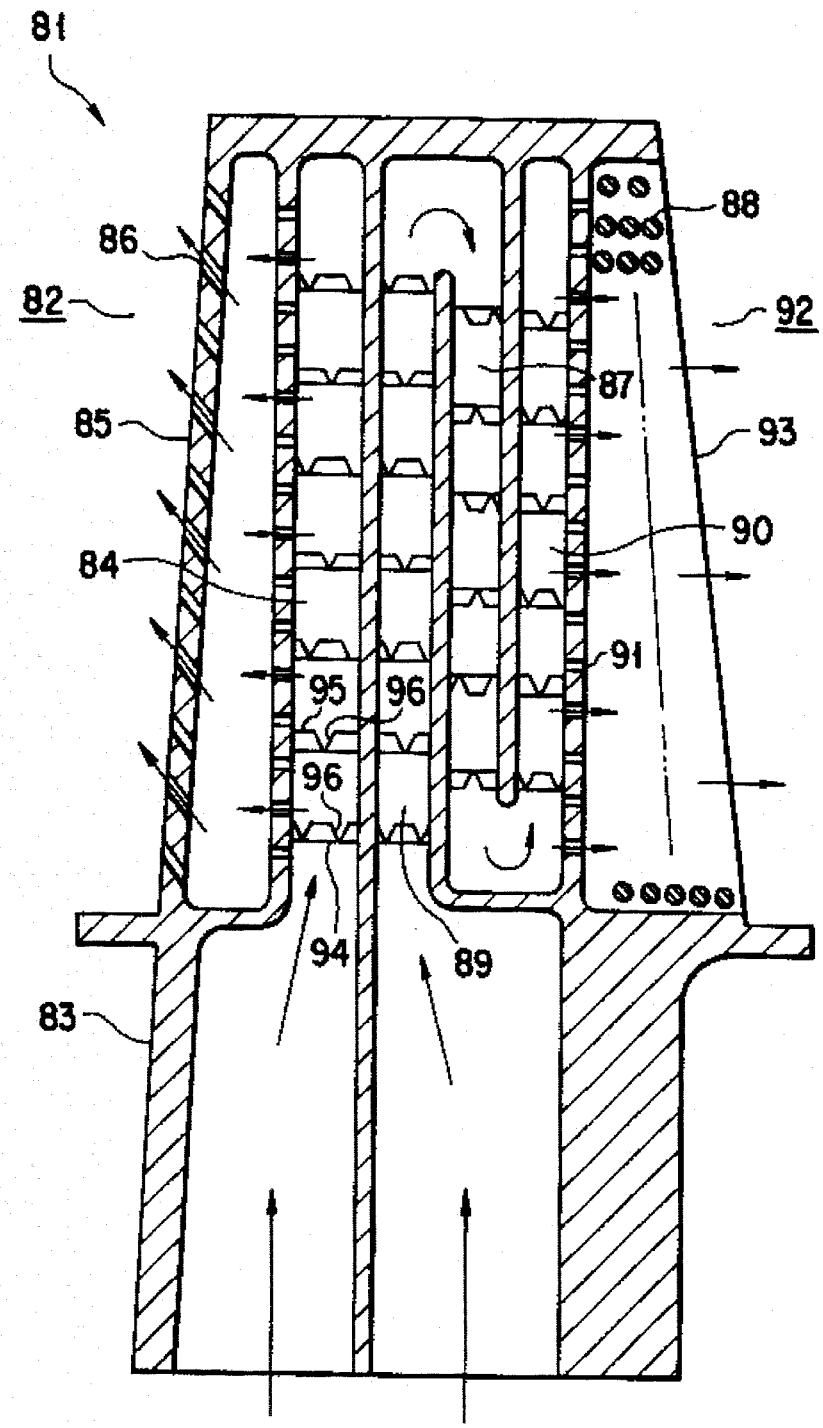
F I G. 12

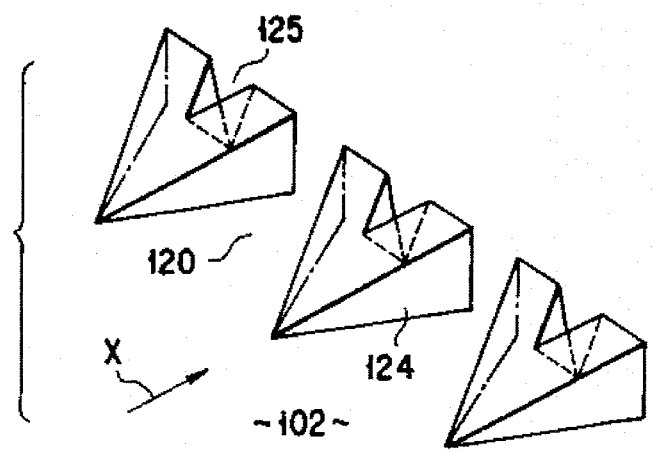
F I G. 26
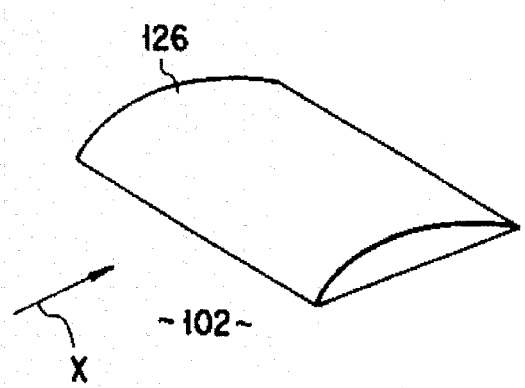
F I G. 27
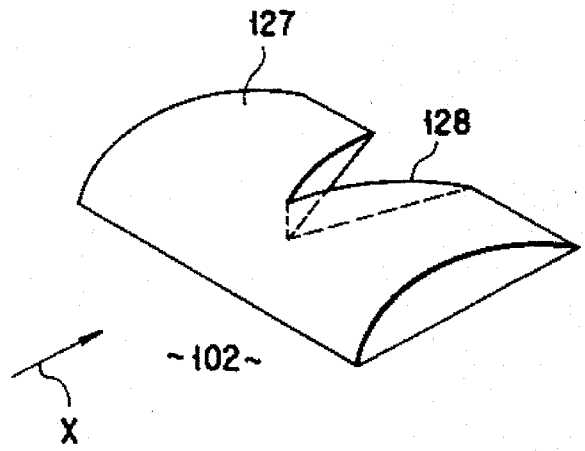
F I G. 28
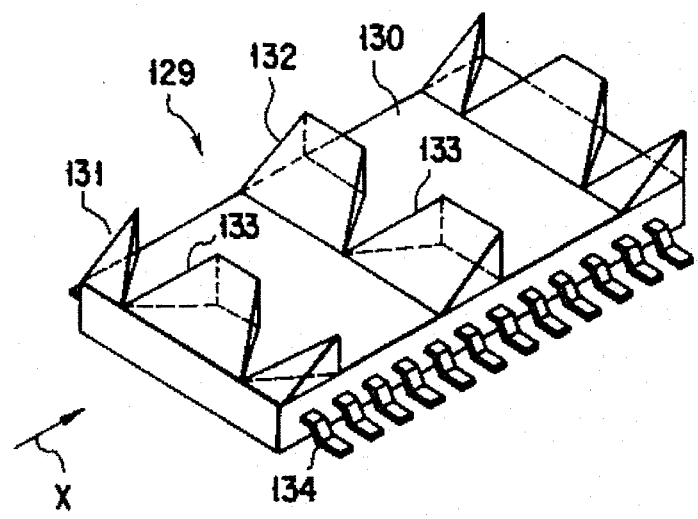
F I G. 29

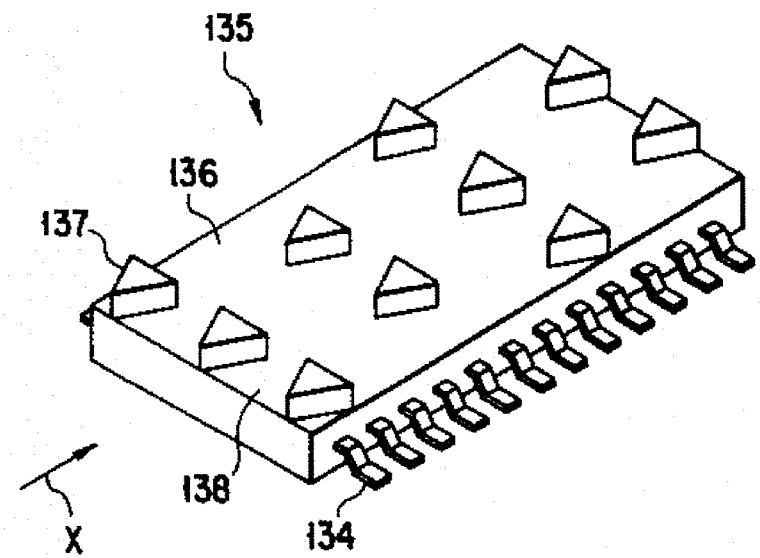
F I G. 30

COOLED TURBINE BLADE FOR A GAS TURBINE

BACKGROUND OF THE INVENTION

1. Field of the Invention

The present invention relates to a cooled turbine blade for a gas turbine and more particularly to a cooled turbine blade provided therein with cooling flow passages and elements related thereto.

2. Description of the Related Art

There are various types of gas turbines, and one of them is of a direct driving type which is driven by a combustion gas flow which drives a compressor. The higher the temperature of the main flow gas is, the higher heat efficiency the direct driving gas turbine has. Thus, attempts have been made to increase the temperature of the main gas flow. In general, however, the upper temperature of the main gas flow is limited by the heat resistance of the turbine blade. In order to improve the heat efficiency by increasing the temperature of the main gas flow, therefore, a turbine blade which withstands a higher temperature is required. The heat resistance of the turbine blades is enhanced by improving the material of the turbine blade and cooling the turbine blades from their inside to lower their surface temperatures. The turbine blade of this type is formed therein with cooling flow passages for conducting water or a cooling gas such as water vapor or air and uses various means for increasing cooling efficiency.

A conventional cooled type turbine blade of this type is shown in FIGS. 31 and 32. FIG. 31 is a transverse cross-sectional view of the turbine blade and FIG. 32 is a longitudinal cross-sectional view thereof. The turbine blade 1 has an aerofoil blade portion 2 in which a plurality of serially arranged cooling flow passages 4, 10, 12 and 13 are formed extending in the span direction. A cooling gas flows through the cooling flow passages 12, 10 and 13 via passages formed in a shank 3 to cool the wall portions 6 and 7 of the blade. A great number of nozzles 8 and 17 are formed in the wall portions 6 and 7, and part of the cooling gas flowing through the cooling flow passages 4 and 13 is jetted out of the nozzles 8 and 17. The jetted cooling gas flows in a film state along the surfaces of the suction side and the pressure side of the aerofoil blade portion 2 so as to interrupt heat transmitted from the environmental main gas flow to the surface of the aerofoil blade portion 2 and so as to cool the surface of the aerofoil blade portion 2. Thus, so-called film cooling is performed.

An impingement chamber or a leading edge chamber is formed in the leading edge portion of the blade. The cooling gas supplied to the cooling flow passage 4 is jetted from a great number of small holes and impinges on the inner surface of the leading edge wall 5, whereby performing so-called impingement cooling. The leading edge wall 5 is formed with a great number of nozzles to form a so-called shower head 9. The cooling gas in a leading edge chamber is jetted from the washer head 9 and the film cooling is performed.

In a trailing edge portion 15 of the blade is formed a trailing edge chamber into which the cooling gas flows from the cooling flow passage 13 through a nozzle 14. In the trailing edge of the blade is formed a slit-shaped trailing edge nozzle 16 from which the cooling gas in the trailing edge chamber is exhausted externally. A great number of the pin fins 11 are formed in the trailing edge chamber to improve the cooling efficiency of the trailing edge portion 15.

With the cooled turbine provided with such a turbine blade, the average surface temperature of the blade can be maintained at 850° C. when the temperature of the main flow gas is within a range from 1,000° C. to 1,300° C. In this case, the amount of flow of the cooling gas is several percent of that of the main flow gas. Recently, however, a gas turbine has been developed that operates at a main flow gas temperature from 1,300° C. to 1,500° C. Further, development of a gas turbine which uses hydrogen as a fuel and operates at a temperature from 1,500° C. to 2,000° C. is now under consideration.

If such an improved gas turbine were manufactured on the basis of the design of the conventional gas turbine, the amount of cooling gas would have to be made extremely large in order to maintain an average surface temperature of 850° C., and thus the heat efficiency of a gas turbine or the whole heat plant including the gas turbine would be extremely reduced. Therefore, it is difficult to actualize such an improved gas turbine.

A cooled turbine blade was proposed which can provide a higher cooling efficiency without increasing the flowing amount of the cooling gas, which is disclosed, for example, in the U.S. Pat. No. 5,165,852. The cooled turbine blade is provided in its aerofoil blade portion with a first cooling flow passage disposed at the pressure side and a second cooling flow passage disposed at the suction side. The cooling gas flows in the radial outward direction of the turbine rotor including the turbine blade, i.e., from the shank of the turbine blade toward the wing tip portion in the first cooling flow passage and in the radial inward direction, i.e., from wing tip portion toward the shank in the second cooling flow passage.

When the cooling gas flows in the radial direction of the turbine rotor, a Coriolis force produced by rotation of the rotor is exerted on the cooling gas. A secondary flow in the direction crossing the cooling flow passage occurs in the cooling gas flowing through the cooling flow passage, and a pair of longitudinal vortexes are produced in the cooling gas flowing through the cooling flow passage. The vortexes in the first cooling flow passage and the second cooling flow passage are directed opposite to each other. The cooling gas collides against the inner surface of the pressure side wall of the aerofoil blade portion in the first cooling flow passage and on the inner surface of the suction side wall of the aerofoil blade portion in the second cooling flow passage. In this way, both the pressure side and the suction side of the aerofoil blade portion are effectively cooled and thus a high cooling efficiency can be attained by a small amount of the cooling gas.

One of means for effectively cooling the wall of the cooling flow passage (i.e., the wall portion of the aerofoil blade portion) by the flow of the cooling gas in the cooling flow passage comprises a great number of projections formed in the inner surface of the wall of the cooling flow passage so that the cooling gas flows in a turbulent flow state in the vicinity of the inner surface of the wall.

An embodiment of a turbine blade having such projections is shown in FIGS. 33 and 34. The turbine blade 21 has a shank portion 21a and an aerofoil blade portion 21b. In the aerofoil blade portion 21b are formed a plurality of cooling flow passages 22 having their ends serially connected together by means of return portions 24. A cooling gas supplied from a cooling gas inlet 23 flows through the adjacently arranged cooling flow passages 22 via the return portions 24 and is finally discharged from a nozzle formed in a trailing edge portion 26 into the main gas.

On the walls of the cooling flow passages 22, for example, the inner surface of the suction side walls of the aerofoil blade portion are formed a plurality of turbulence promoting ribs 27 which extend perpendicularly to the flow direction of the cooling gas. The cooling gas is formed into a strong turbulence in the vicinity of the inner surface of the wall by means of the turbulence promoting ribs 27. The heat transmission through the inner surface is enhanced to improve the cooling effect. Partition walls 29 are intended to divide adjacent cooling flow passages 22, and pin fins 29 are formed in the trailing edge portion.

Jpn. Pat. KOKAI Publication No. 60-101202 discloses a blade having turbulence promoting ribs formed slantwise with respect to the flowing direction of the cooling gas. Such turbulence promoting ribs produce a strong turbulence to improve the cooling effect. The inclined turbulence promoting ribs can prevent foreign matters from being deposited on or at a specific portion. Jpn. Pat. KOKAI Publication No. 5-10101 discloses an arrangement of v-shaped slantwise turbulence promoting ribs.

With the gas turbine operating at 1,300° C. to 1,500° C. or at 1,500° C. to 2,000° C., it is necessary that the turbine blade be cooled at a higher cooling efficiency at a smaller flow rate of the cooling gas. Thus, it is required that not only the cooling efficiency of a plurality of cooling means be enhanced as described above but also a higher cooling efficiency be attained by the combination of such cooling means.

When the cooling flow passages extend in the span direction of the turbine blade, i.e., in the radial direction of the turbine rotor, they act as a kind of centrifugal fan due to a centrifugal force produced by a high rotational speed of the rotor. Upon increasing the cooling efficiency by a Coriolis force as described above, the cooling gas is supplied to the pressure side cooling flow passages in the radial outward direction and to the suction side passages in the radial inward direction. The cooling gas flow through the pressure side cooling flow passages is accelerated because the cooling gas flows in the radial outward direction. On the other hand, the cooling gas flow through the suction side passage is blocked because the cooling gas flows in the radial inward direction.

In the gas turbine blade as disclosed in the U.S. Pat. No. 5,165,852, the cooling flow passages at both the suction side and the pressure side, which are connected in series are the same in number so that the disadvantage of the flow of the suction side cooling gas is canceled out. In generally, the most downstream cooling flow passage communicates with the nozzle formed in the suction side or the pressure side of the aerofoil blade portion or the trailing edge portion. The cooling gas which has flowed through the most downstream coiling passage is discharged from the nozzle into the main flow gas to perform film cooling. In this structure, the most downstream passage constitutes the suction side cooling flow passage. Thus, the cooling gas in the suction side cooling flow passage is jetted out. Since the flow of the cooling gas in the suction side cooling flow passage is directed radially inward, the gas flow is also restricted. More specifically, the static pressure of the cooling gas in the suction side cooling flow passage is low. In this connection, the cooling gas must be supplied at a higher pressure in order to supply a predetermined amount of the cooling gas to the man flow gas through the nozzle. Increase of the driving power necessary for the cooling gas supply lowers the total heat efficiency of the gas turbine.

If the number of the cooling flow passages at the pressure side is made larger by one than those a the suction side, the most downstream cooling flow passage constitutes a pressure side passage. Thus, the increase of the driving power is prevented.

In general, the cross section of the aerofoil blade has a large camber, and thus the dimension of the suction side flow passages in the chord direction is larger than that of the pressure side flow passages in the chord direction. Provision of one more cooling flow passage at the pressure side than those at the suction side makes large the difference of the cross section between the cooling flow passages at the suction side and at the pressure side. In the cooling flow passages at the suction side, the gas velocity tends to decrease and to lower the cooling efficiency. Thus, it is not preferable that the cross section of the passages at the suction side be made larger than that at the pressure side.

It is possible to correct the imbalance of the cross sections by displacing the partition for dividing the interior of the aerofoil blade portion into the cooling flow passages at the suction side and at the pressure side. In this arrangement, however, the cooling flow passages has a flat cross section extending in the chord direction. Such flat cross section weakens longitudinal vortexes produced by a Coriolis force in the suction side cooling flow passages, leading to an unfavorable result that the cooling efficiency in the suction side cooling flow passages is much more reduced.

When the means for improving the cooling efficiency by a Coriolis force is used, there occurs the disadvantages in that the driving force required for conducting the cooling gas as described above and/or the cooling efficiency of the suction side cooling flow passages is lowered more. When, on the other hand, both means for improving the cooling efficiency by a Coriolis force and the turbulence promoting ribs are used, the pressure loss of the cooling gas produced by the turbulence promoting ribs is large and the above-mentioned disadvantages become much more remarkable. Further, turbulence produced by the turbulence promoting ribs interferes with longitudinal vortexes produced by the Coriolis force, whereby the multiplier effect of the turbulence promoting ribs and the Coriolis force is sometimes reduced.

SUMMARY OF THE INVENTION

The present invention was made under the above-mentioned circumstances and the object thereof is to provide a cooled turbine blade of a gas turbine which employs means for improving cooling efficiency due to a Coriolis force and means for increasing cooling gas flow so as to improve the cooling efficiency more.

According to one aspect of the present invention, a turbine blade has an aerofoil portion including at least one pressure side passage and at least two suction side passages. Both the passages extend in the span direction of the aerofoil blade portion and are serially connected together to form a continuous cooling flow passage assembly. In the cooling flow passage assembly, the number of the suction side cooling flow passages is larger than that of the pressure side cooling flow passages. A cooling gas is supplied from the shank side of the blade to the pressure side cooling flow passages, flows through the pressure side flow passages in the radial outward direction of a turbine rotor and further flows through the suction side passages in the radial inward direction. At least one of the suction side cooling flow passages constitutes the most downstream cooling flow passage whose radial inside end portion communicates with the radial inside end portions of the upstream suction side cooling flow passages. The most downstream cooling flow passage communicates with a hole opened to the surface of the aerofoil blade portion or the trailing edge portion. The cooling gas flows through the most downstream suction side passage in the radial outward direction and is discharged into a main flow gas.

In this turbine blade, the cooling gas flows through the most downstream cooling flow passage in the radial outward direction whereby the flow of the cooling gas is accelerated by the centrifugal force produced by rotation of the turbine rotor and is discharged efficiently from the hole. Thus, the driving power required for causing the cooling gas to flow through the continuous cooling flow passage assembly is reduced and the heat efficiency of the overall gas turbine is increased. Since the number of the suction side passages is larger than that of the pressure side passages, the difference of the cross sections between the suction side cooling flow passages and the pressure side cooling flow passages can be reduced, whereby the cooling gas flows smoothly through the cooling flow passage assembly so as to cool the suction side cooling flow passages uniformly and efficiently. As it is unnecessary to undesirably deviate the partition for dividing the interior of the aerofoil blade portion into the suction side cooling flow passages and the pressure side cooling flow passages, the cross sections of the passages at both the suction side and the pressure side can take a substantially square shape so that the longitudinal vortexes produced in the cooling flow passages due to a Coriolis force can be made strong in order to improve the cooling efficiency.

According to the preferred embodiment of the present invention, the flow speed of the cooling gas through the most downstream cooling flow passage can be increased by making the cross-sectional area of the most downstream cooling flow passage smaller than that of each of the other cooling flow passages. In the most downstream suction side cooling flow passage, increase of the cooling efficiency due to a Coriolis force cannot be expected because the cooling gas flows in the radial outward direction as described above. However, the higher flow speed of the cooling gas by reducing the cross-sectional area of the cooling flow passage can compensate the lowering of the cooling efficiency.

According to another aspect of the present invention, there is provided a turbine blade comprising a plurality of partitions arranged substantially parallel with each other and also parallel with the direction of a turbine rotor and dividing the interior of an aerofoil blade portion into a plurality of passages extending in the chord direction. The interior of each passage is divided substantially into a suction passage portion and a pressure passage portion by a partition wall substantially perpendicular to the direction of the wing thickness, i.e., the rotational direction of the turbine rotor. Even when the aerofoil section of the blade has a large camber in this case, suitable relation of the cross sections of the cooling flow passages between the suction and pressure sides can be determined. In this arrangement, the cross section of the cooling flow passage can be made substantially square. In this regard, strong longitudinal vortexes can be produced by a Coriolis force, and the cooling efficiency can be improved.

According to a further aspect of the present invention, a turbine blade has a plurality of turbulent promoters which are projectingly provided on the inner surfaces of walls defining cooling flow passages. Each turbulent promoter preferably has a rib shape and formed with a triangular notch. Another preferable embodiment has turbulence promoters each comprising a triangular projection.

The projection or notch of each turbulence promoter inclines to the flow of the cooling medium. A longitudinal vortex is therefore generated at the projection or the notch, deflecting the flow of the cooling medium such that the medium collides against the inner surface of the cooling flow passage. This increases the cooling efficiency. Furthermore, the turbulence promoters produces longitudinal vortexes similar to those generated by the above-mentioned Coriolis force. Since the longitudinal vortexes produced by the turbulence promoters do not interfere with one another, they do not adversely influence the cooling efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a cross-sectional view taken along line A—A of FIG. 1;

FIG. 3 is a cross-sectional view taken along line B—B of FIG. 1;

FIG. 12 is a cooled turbine blade according to a fourth embodiment of the present invention;

FIG. 26 is a perspective view of turbulence promoters of a sixteenth embodiment of the present invention;

FIG. 27 is a perspective view of turbulence promoters of a seventeenth embodiment of the present invention;

FIG. 28 is a perspective view of a turbulence promoter of an eighteenth embodiment of the present invention;

FIG. 29 is a perspective view of turbulence promoters of a nineteenth embodiment of the present invention;

FIG. 30 is a perspective view of turbulence promoters of a twentieth embodiment of the present invention;

DETAILED DESCRIPTION OF THE PREFERRED EMBODIMENTS

The preferred embodiments will be described with reference to the accompanying drawings.

Figure 1:
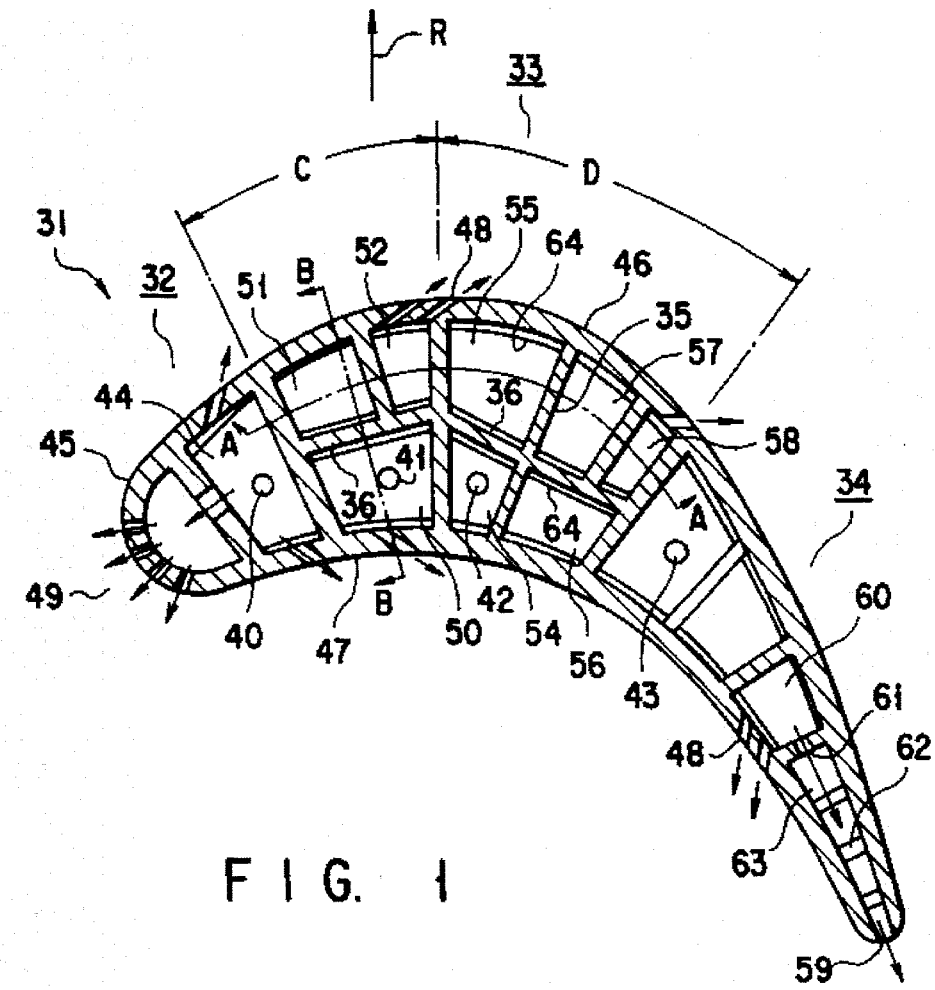
FIG. 1 is a transverse cross-sectional view of a cooled turbine blade according to a first embodiment of the present invention.
Figure 4:
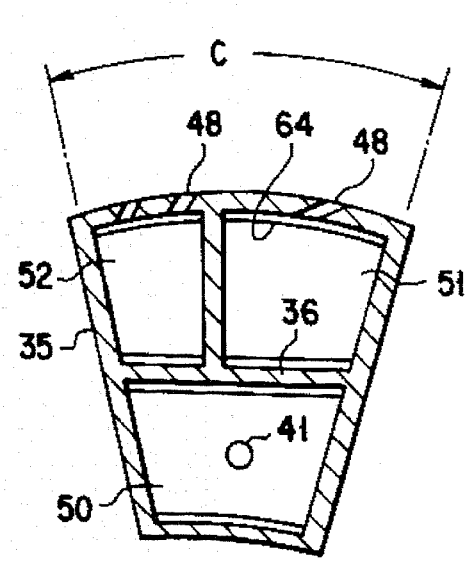
FIG. 4 is a longitudinal cross-sectional view of the part of a first modification corresponding to the C section of the cooled turbine blade of FIG. 1.
Figure 5:
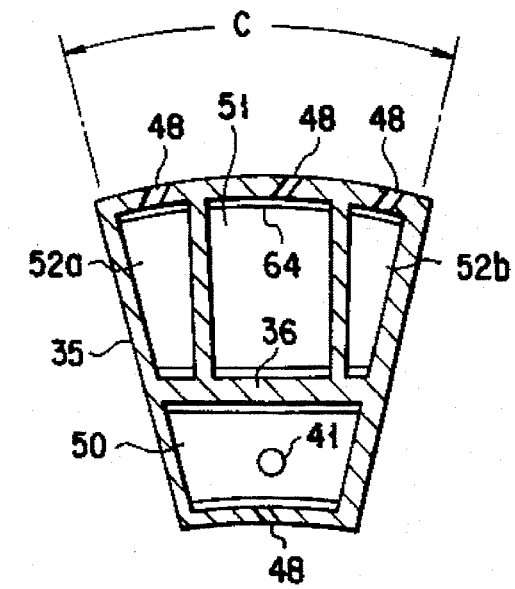
FIG. 5 is a longitudinal cross-sectional view of the part of a second modification corresponding to the C section of the cooled turbine blade of FIG. 1.

First, a first embodiment of the present invention will be described with reference to FIGS. 1 to 5. FIG. 1 is a transverse cross-sectional view of a turbine blade of a wing. FIG. 2 is a longitudinal cross-sectional view taken along line A—A of FIG. 1, and FIG. 3 is a longitudinal cross-sectional view taken along line B—B of FIG. 1. FIG. 4 is a transverse cross-sectional view of the part of a first modification corresponding to a C section of the turbine blade as shown in FIG. 1, and FIG. 5 is a transverse cross-sectional view of the part of a second modification corresponding to a C section of the turbine blade as shown in FIG. 1.

As shown in FIGS. 1 to 5, the turbine blade 31 has partitions 35 for dividing its interior ranging from the leading portion 32 to the trailing portion 34 via an intermediate portion 33 and partition walls 36 for dividing the intermediate portion 33 into suction side portions and pressure portions. A plurality of cooling flow passages extending in the span direction are defined by the partitions 35 and the partition walls 36 in the intermediate portion 33. The turbine blade 31 is rotated in direction R.

In other portions than the leading portion 32, cooling passages include three return flow passages. The cooling flow passages formed in the intermediate portion 33 forms return flow passages returning at the top and the root 38 of the blade. A cooling medium or a cooling gas is supplied from the root 38 of the blade to the corresponding cooling flow passages via four supplying portions 40, 41, 42 and 43.

In the leading portion 32, the cooling medium or the cooling gas supplied from the supplying portion 40 is conducted through a cooling flow passage 44 to effect impingement cooling of the inner wall surface of a leading edge 45. The cooling medium is also discharged from film holes 48 formed in a suction side blade surface 46 and a pressure side blade surface 47 of the cooling flow passage 44 to perform film cooling. The leading edge 45 is provided with a shower head 49 for performing film cooling.

Three return flow passages are formed in C section of the intermediate portion 33. In other words, the C section is divided into a first flow passage 50, a second flow passage 51 and a third flow passage 52 by the partition wall 36 and the partition 35. The cooling medium supplied from the supplying portion 41 of the root 38 flows through the first flow passage 50 in the radial outward direction. Then, the cooling medium returns again at a return portion 39 of a leading portion 37 to flow through the second flow passage 51 in the radial inward. Thereafter, the cooling medium returns further at the return portion 39 to flow through the third flow passage 52 at the suction side. In the midway of the flow, part of the cooling medium is discharged from film holes 48 to effect film cooling, discharged from jet holes 53 to cool the leading portion 37. Thereafter, the remaining cooling medium is discharged into the main flow.

In this way, increase of the heat transmission efficiency due to the Coriolis force is used in the first flow passage 50 and the second flow passage 51 to cool the blade walls. In order to avoid the disadvantage that the cooling medium does not flow in the direction of a Coriolis force, a great number of film holes 48 are formed as a film jet flow passage in the third flow passage 52. The similar film holes to the film holes 48 formed in the third flow passage 52 may be formed in the first flow passage 50 and the second flow passage 51 so as to perform film cooling.

The three return flow passages are formed in the C section of the intermediate portion 33. More specifically, the C section is divided by the partition wall 36 into a first flow passage 50 at the pressure side and a second flow passage 51 at the suction side. The cooling medium supplied from the supplying portion 41 of the blade root 38 flows in the radial outward direction through the first flow passage 50. Then, the cooling medium returns at the return portion 39 of the leading portion 37 and flows in the radial inward direction in the second flow passage 51. Thereafter, the cooling medium returns again at the return portion 39 of the root 38 and flows through a third flow passage 52 at the suction side. The cooling medium flows out of the film holes 48 to perform film cooling and is conducted out of a discharge hole 53. Finally, the cooling medium is discharged into the main flow.

In this way, a Coriolis force are used for increasing the heat transmission in the first flow passage 50 and the second flow passage 51 in order to cool the blade wall. In the third flow passage 52 through which the cooling medium flows in the reversal direction to the Coriolis force, a great number of film holes 48 as film jetting flow passages are provided in order to increasing cooling ability. For cooling enhancement, holes similar to the film holes formed in the third flow passage 52 may be formed in the first flow passage 50 and the second flow passage 51.

The cooling efficiency gradually decreases due to the facts that the temperature of the cooling medium increases at the return flow passages and the amount of the cooling medium decreases due to its discharge from the film holes 48. The cross-sectional areas of the first, second and third flow passages 50, 51 and 52 decrease in this order so that the flow speeds of the cooling medium are made faster in this order so as to prevent the lowering of the cooling efficiency.

In the D section of the intermediate portion 33, the cooling medium supplied from the supplying portion 42 of the root 38 flows through a fourth flow passage 54 at the pressure side in the radial outward direction and then through a fifth flow passage 55 at the suction side in the radial inward direction. Thereafter, the cooling medium flows through a sixth flow passage 56 at the pressure side in the radial outward direction and then through a seventh flow passage 57 at the suction side in the radial inward direction. Finally, the cooling medium flows in an eighth flow passage 58 formed with the film holes 48 at the suction side. As the flow medium flows through these flow passages, it cools them and is discharged into the main flow.

In the trailing portion 34, the cooling medium supplied from the supplying portion 43 of the root 38 flows in the radial outward direction, passes through the return flow passages formed in a trailing edge 59 in turn and is conducted through an orifice 61 formed in the partition 35 of the final flow passage 60. The cooling medium flows into the trailing edge portion 63 provided with pin fins 62.

After performing convention cooling at the pin fins 62, the cooling medium is jetted into the main flow. A plurality of projecting ribs 64 are formed on the inner surface of the blade wall so as to intersect with the flow direction. The flowing cooling medium forms a turbulence flow by means of the ribs 64 and cools the wall more.

In this arrangement, the number of flow passages which can use a Coriolis force increases. In other words, the cooling medium flows radially outward in the first, fourth and sixth flow passages 50, 54 and 56 and radially inward in the second, fifth and seventh flow passages 51, 55 and 57 so that areas effecting high internal heat transmission increase. A high cooling effect is attained in conjunction with the film cooling in the third and eighth flow passages 52 and 58.

The flow passages in the C section of the intermediate portion 33 are not always limited to the ones as described above, but flow passages as shown in FIGS. 4 and 5 can be used and have the same effects as the above-mentioned ones.

In the first modification of the flow passages as shown in FIG. 4, the second flow passage 51 can be arranged at the trailing edge side, and the third flow passage 52 can be arranged at the leading edge side. In FIG. 4, the number of the film holes 48 in the second flow passage 51 is smaller than that in the third flow passage 52. However, it is not always necessary to provide these film holes 48.

In the second modification of the flow passages as shown in FIG. 5, two third flow passages 52*a* and 52*b* corresponding to the third flow passage 52 are arranged at the leading edge side and the trailing edge side of the second flow passage 51. The cooling medium returning from the first flow passage 50 in the leading portion 37 flows through the second flow passage 51 in the radial inward direction and is divided into two parts to flow through the third flow passages 52*a* and 52*b* in the radial outward direction after returning again in the root 38. In the midway, part of the cooling medium is discharged from the film holes 48 to perform film cooling. In FIG. 5, the number of the film holes 48 in the first flow passage 51 is smaller than that in each of the third flow passages 52*a* and 52*b*. However, it is not always necessary to provide these film holes 48. More third flow passages than two can be provided.

Figure 6:
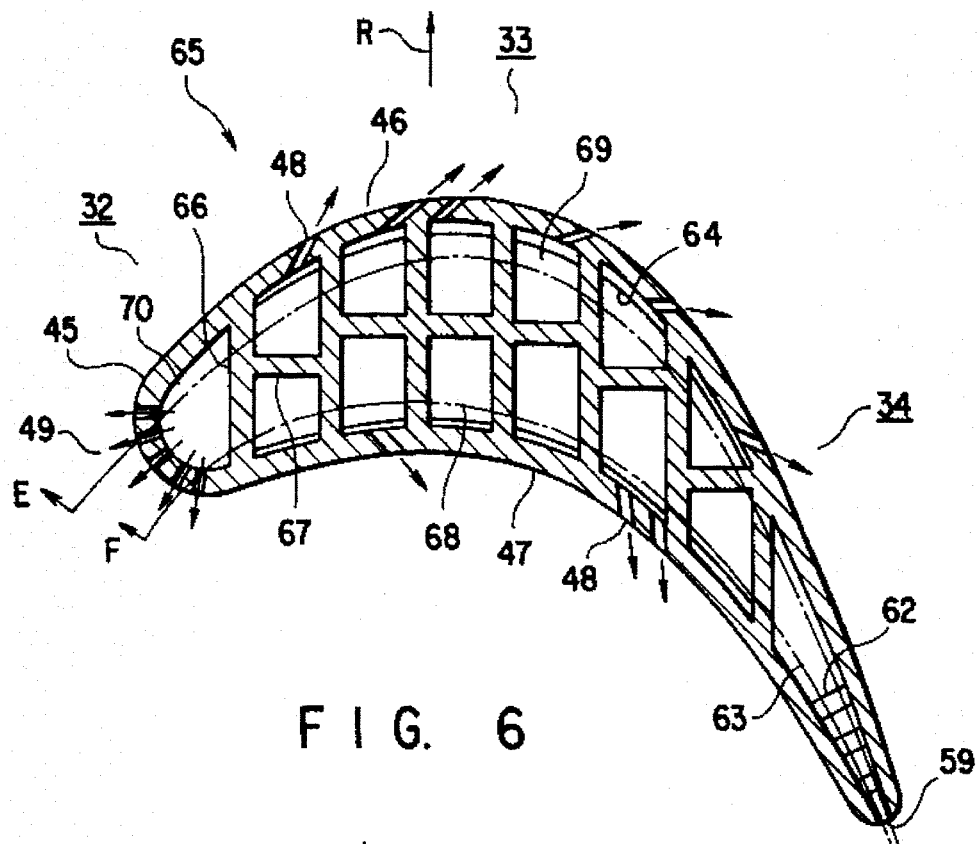
FIG. 6 is a transverse cross-sectional view of a cooled turbine blade according to a second embodiment of the present invention.
Figure 7:
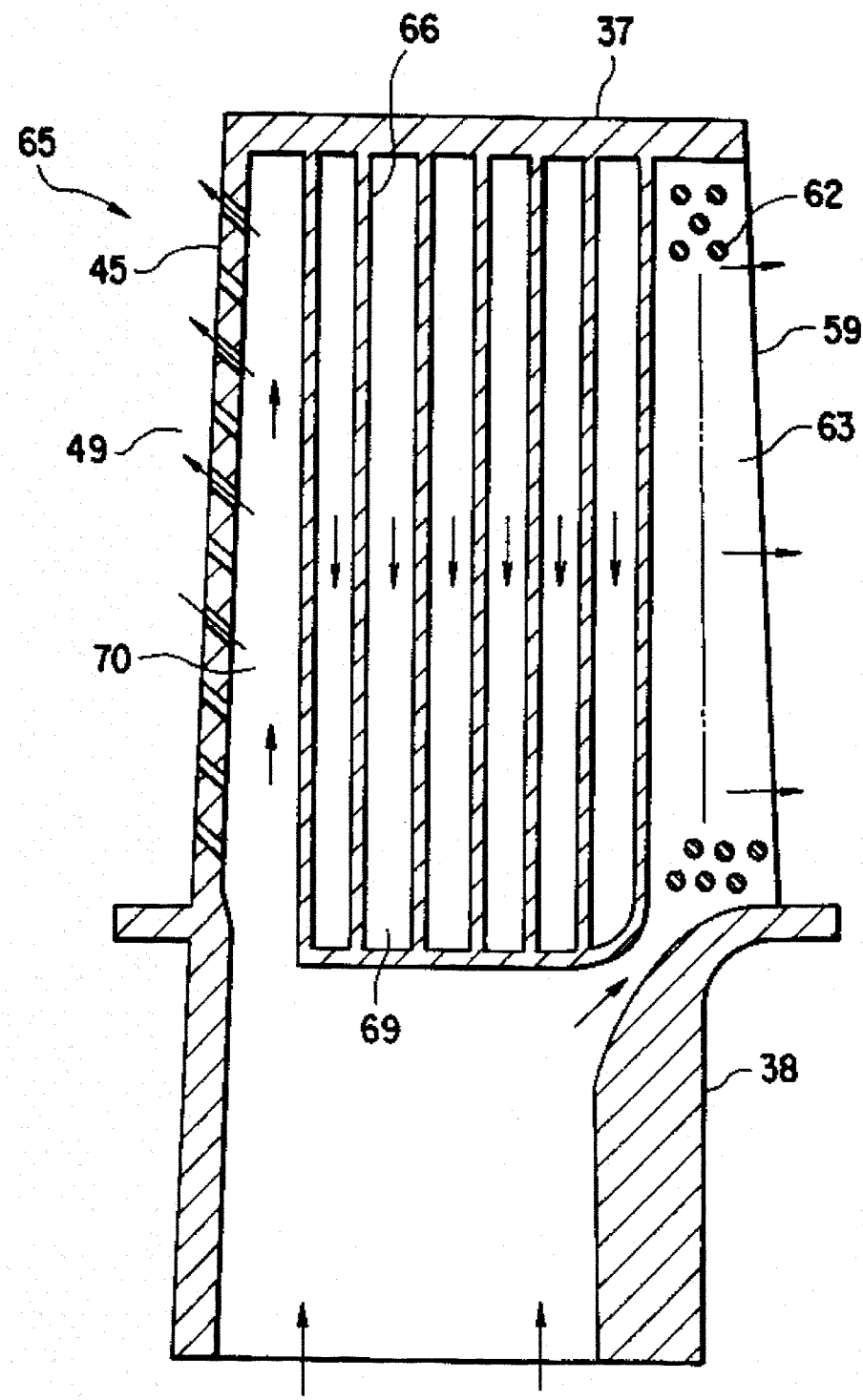
FIG. 7 is a cross-sectional view taken along line E—E of FIG. 6.

A second embodiment will be described with reference to FIGS. 6 to 8. FIG. 6 is a transverse cross-sectional view of a cooled turbine blade of the second embodiment. FIG. 7 is a cross-sectional view taken along line E—E of FIG. 6 and FIG. 8 is a cross-sectional view taken along line F—F of FIG. 6.

Figure 8:
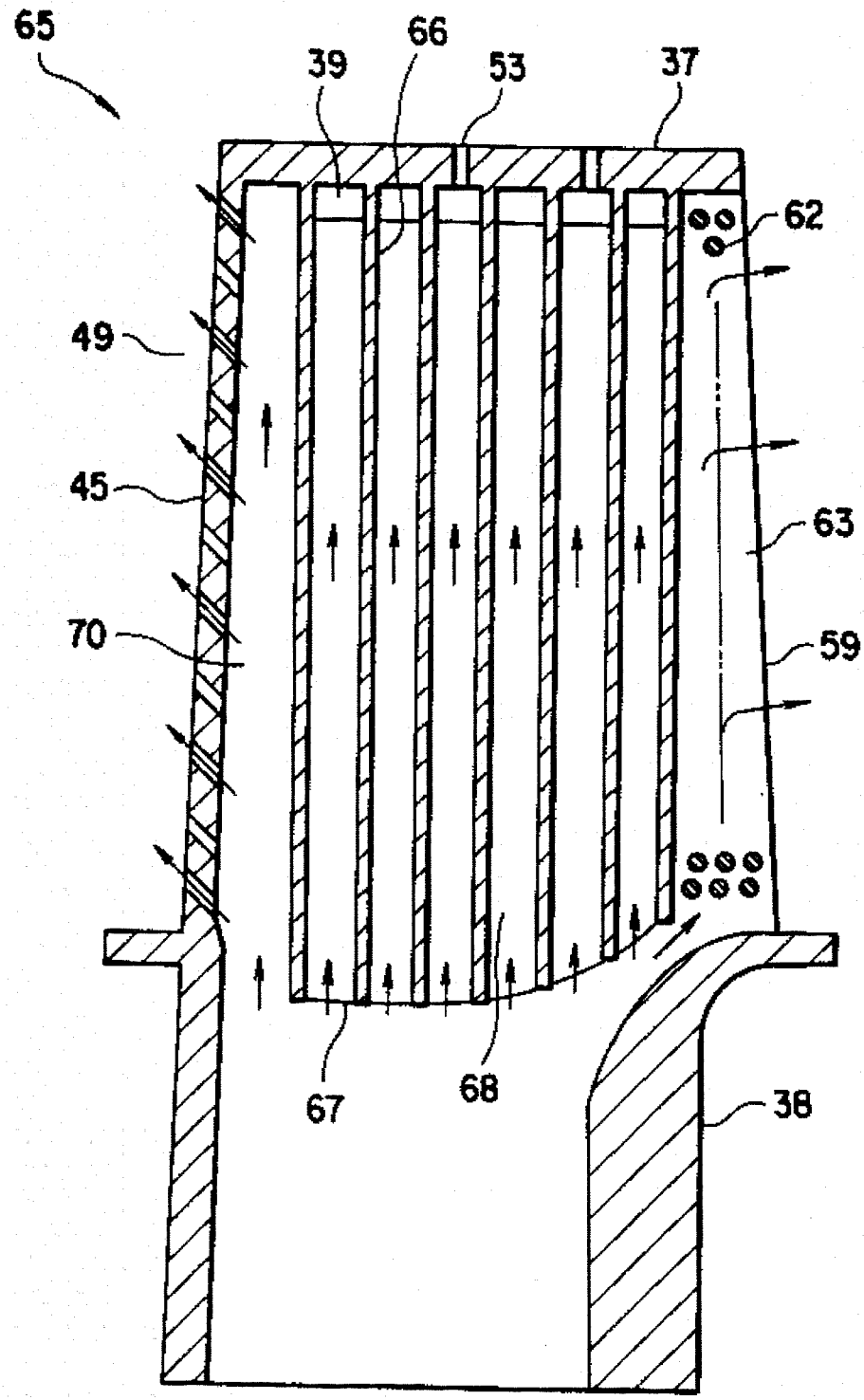
FIG. 8 is a cross-sectional view taken along line F—F of FIG. 6.

As shown in FIGS. 6 to 8, the cooled turbine blade 65 comprises a leading portion 32, an intermediate portion 33 and a trailing portion 34. The interior of the blade 65 ranging from the leading portion 33 to the trailing portion 34 via the intermediate portion 32 is divided into a great number of cooling flow passages extending in the span direction by partitions 66 parallel with the rotational direction R of the blade and partition walls 67.

The cooling flow passages formed in the intermediate portion 33 comprise a plurality of pressure side flow passages 68 through which the cooling medium branched into the pressure side by the partition walls 67 flows in the radial outward direction, and a plurality of suction side flow passages 69 through which the cooling medium branched into the suction side by the partition walls 67 flows in the radial inward direction. The pressure side flow passages 68 and the suction side flow passages 69 communicate with each other at the return portion 39 and form a return flow passage assembly.

The cooling medium supplied from the root 38 is branched into three flows and flows through the leading portion 32, the intermediate portion 33 and the trailing portion 34. In the leading portion 32, the supplied cooling medium flows through a cooling flow passage 70 extending in the span direction and performs film cooling of the leading edge 45 formed with a shower head 49.

The supplied cooling medium flows in the radial outward direction in the intermediate portion 33 and is conducted in the radial inward direction through the suction side flow passage 69 after returning at the return portion 39 of the leading portion 37. The cooling medium is discharged from the film holes 48 formed in the blade surfaces (wing surfaces) 46 and 47 to perform film cooling and flows into the main flow through the jet holes 53 formed in the suction side flow passage 69 in the leading portion 37. On the inner wall surface of the suction side flow passages 68 and the pressure side flow passages 69 are formed a great number of projecting ribs 64 which intersect the flow direction.

In the trailing portion 34, the cooling medium flows in a trailing edge portion 63 in which the pin fin 62 is provided and is discharged into the main flow from the trailing edge 59 after convection cooling of the trailing edge portion 63 in the radial outward direction.

The turbine blade as described above provides an intermediate portion 33 in which the number of cooling flow passages which can use a Coriolis force is larger than that of the cooling flow passages which cannot use a Coriolis force. In other words, the pressure side flow passages 68 through which the cooling medium flows in the radial outward direction and the suction side flow passages 69 through which the cooling medium flows in the radial inward direction and which are smaller in number than the pressure side flow passages 68 are divided by the partitions 66 which are parallel with the rotational direction R of the Rotor in such a way that collision of the secondary flow does not occur on the partitions 66 but always occurs on the surfaces of the inner walls of the blade. Thus, the heat transmission increasing effect due o a Coriolis force is utilized in cooling operation without loss thereby performing a high internal heat transmission.

Since the pressure side flow passage 68 and the suction side flow passage 69 are divided by the partition walls 67 perpendicular to the blade rotating direction R, the secondary flow due to a Coriolis force is securely produced to make the heat transmission ratio high.

In the intermediate portion 33, the cooling medium returns at only the return portion 39 of the leading portion 37. However, a return portion at which the cooling medium returns can be provided in the root 38 so that the cooling medium returns more than once.

The blade provides the cooling flow passages whose cross sections are well balanced and which can improve the cooling efficiency. More specifically, the cooled turbine blade 31 has an aerofoil section having a large camber as shown in FIG. 1. Thus, the dimension of the suction side cooling flow passage measured in the chord direction is larger than that of the pressure side cooling flow passage measured in the chord direction. In general, the cross-sectional area of the suction side cooling flow passages is larger than that of the pressure side cooling flow passages.

In the above embodiments, the number of the suction side flow passages is larger than that of the pressure side flow passages as described above, the difference of the cross sectional areas between the suction side cooling flow passages and the pressure side cooling flow passages can be made small whereby the cooling medium (cooling gas) flows smoothly through the cooling flow passage assembly and uniform and effective cooling can be carried out. Since it is unnecessary to undesirably displace the partition walls 36 for dividing the interior of the cooled turbine blade into the suction side passages and the pressure side passages, the cross sections of the pressure side and suction side cooling flow passages can take a substantially square shape. The square cooling flow passages strengthen the longitudinal vortexes produced in the cooling flow passages due to a Coriolis force and improves the cooling efficiency.

The cross section of each of the most downstream cooling flow passages 52 and 58 is made smaller than that of each of the other cooling flow passages, thereby to increase the flow velocity of the cooling medium (cooling gas) in the most downstream cooling flow passages. As the cooling gas flows radially inward through the most downstream cooling flow passages 52 and 58 at the suction side as described above, the cooling effect given by a Coriolis force cannot be expected. Increase of the flow speed of the cooling medium (cooling gas) by reducing the cross-sectional areas of the cooling flow passages can compensate reduction of the cooling efficiency.

Even if the cross section of the blade has a large camber in the above-mentioned cooling flow passages, proper relation between the cross-sectional areas of the suction side cooling flow passages and the pressure side cooling flow passages can be maintained. The cross sections of the pressure side and suction side cooling flow passages can take a substantially square shape, and the square cooling flow passages strengthen the longitudinal vortexes produced in the cooling flow passages due to a Coriolis force and improves the cooling efficiency.

Figure 9:
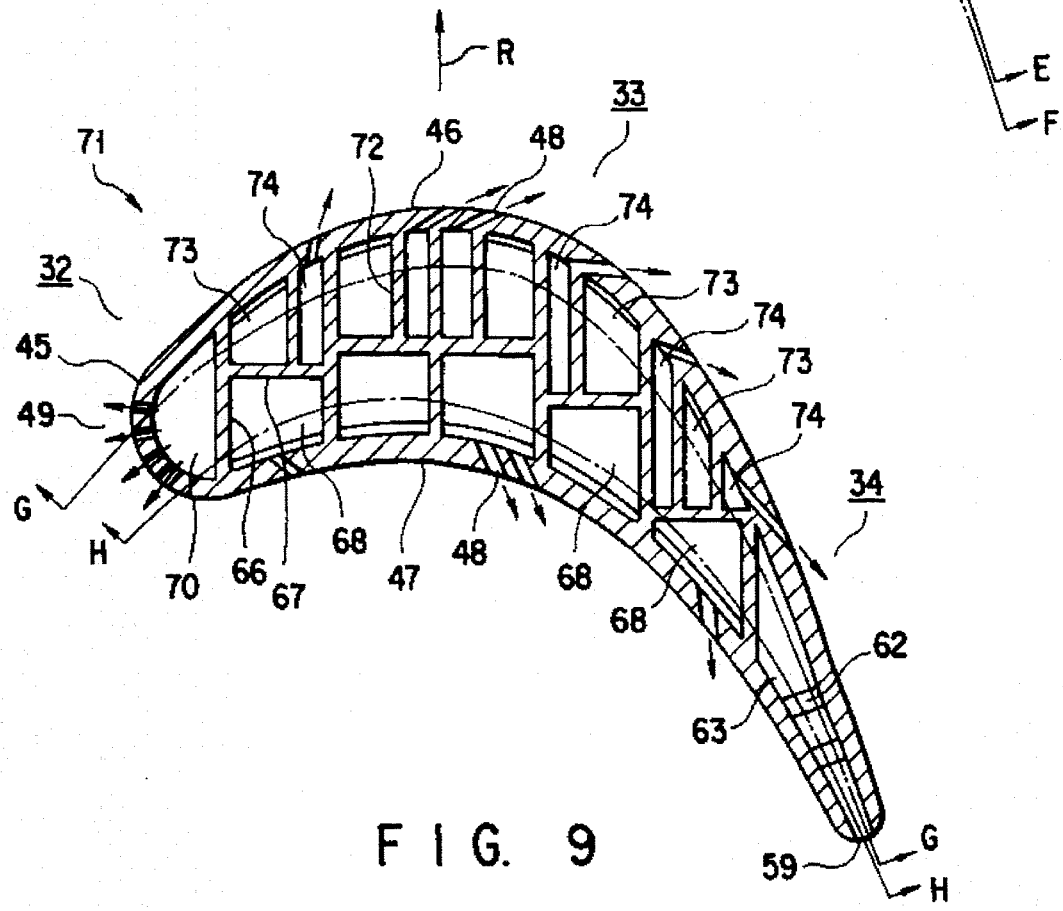
FIG. 9 is a transverse cross-sectional view of a cooled turbine blade according to a third embodiment of the present invention.
Figure 10:
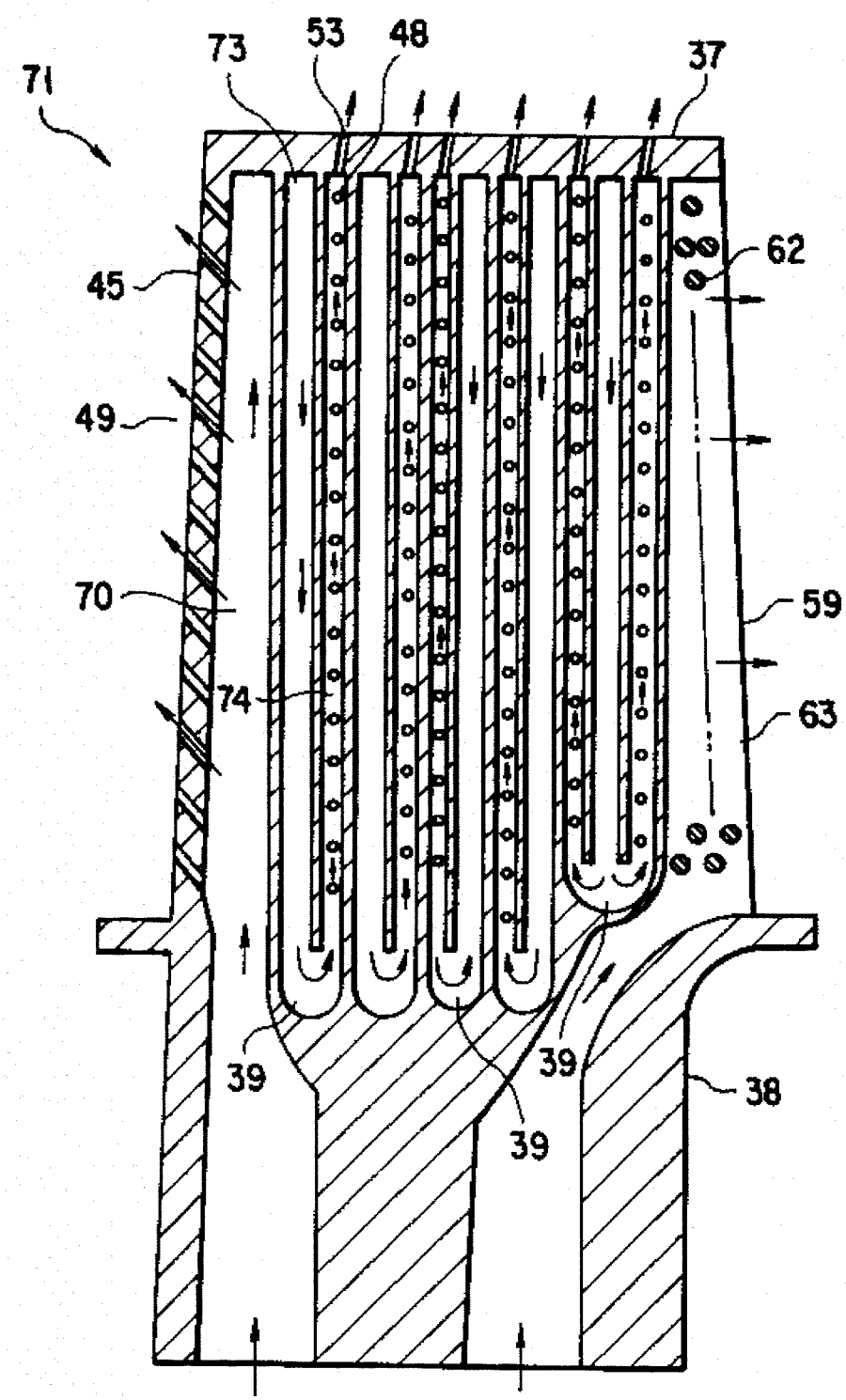
FIG. 10 is a cross-sectional view taken along line G—G Of FIG. 9.
Figure 11:
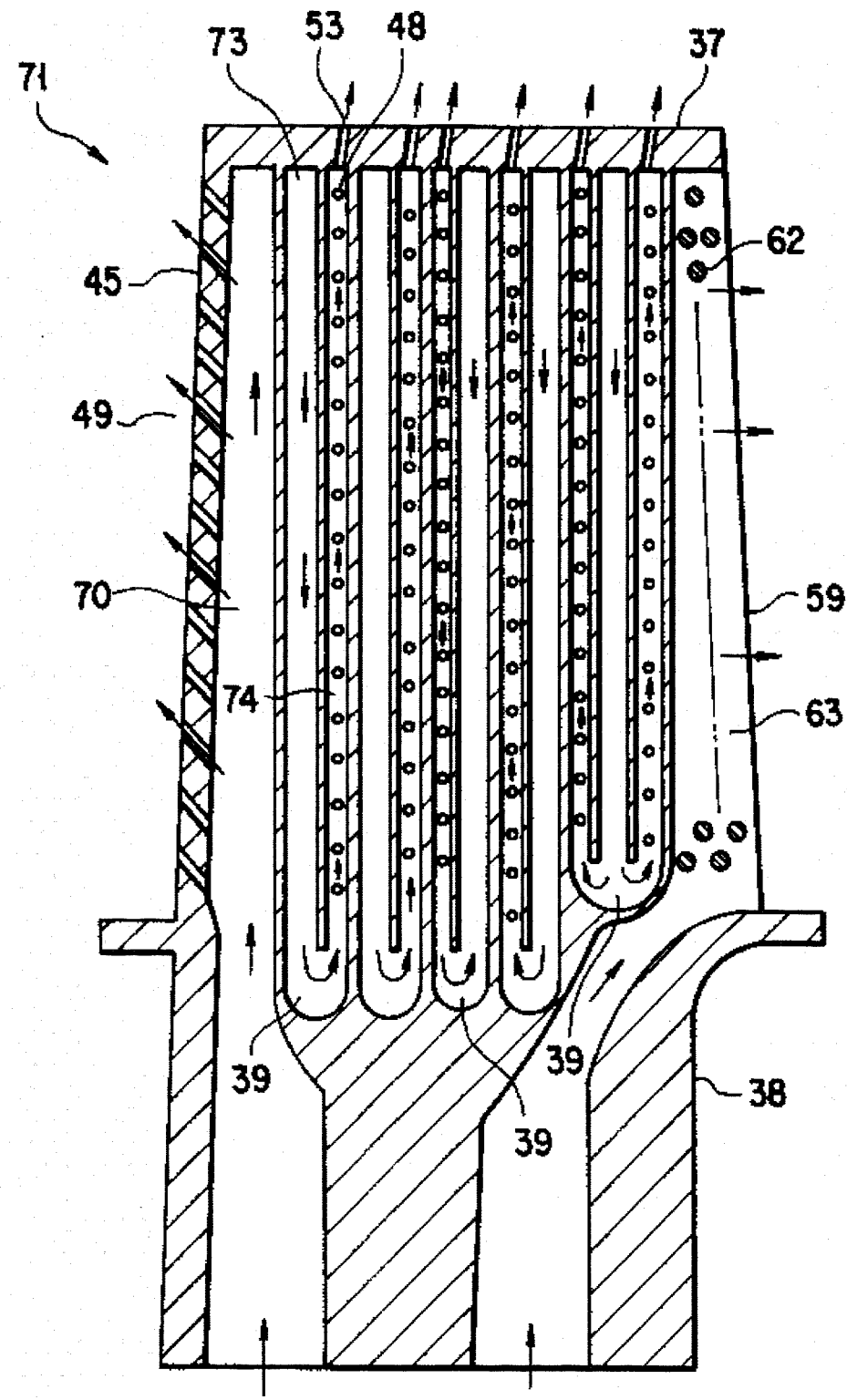
FIG. 11 is a cross-sectional view taken along line H—H of FIG. 9.

In FIGS. 9 to 11 is shown a third embodiment which is a combination of the cooling flow passages of the second embodiment and the first embodiment.

As shown in FIGS. 9 to 11, a cooled turbine blade 71 comprises a leading portion 32, an intermediate portion 33 and a trailing portion 34. The interior of the blade ranging from the leading portion 32 to the trailing portion 34 via the intermediate portion 33 is divided into a plurality of cooling flow passages extending in the span direction by partitions 66 and 72 parallel with the rotational direction R of the blade and partition walls 67 perpendicular to the rotational direction R of the blade.

The cooling flow passages formed in the intermediate portion 33 comprise a plurality of pressure side flow passages 68 which are at the pressure side and through which the cooling medium flows in the radial outward direction, a plurality of first suction side flow passages 73 which is at the suction side and through which the cooling medium flows in the radial inward direction and second suction side flow passages 74 which are adjacent to the first suction side flow passages 73 at the partitions 72 and through which the cooling medium flows in the radial outward direction. In this arrangement, the pressure side flow passages 68, the first suction side flow passages 73, and the second suction side flow passage 74 form a continuous return flow assembly which returns at the return portions 39 of the leading portion 37 and the root 38.

In the front part of the intermediate portion 33, the pressure side flow passage 68 and the first suction side flow passage 73 communicate with each other at the return portion 39 of the leading portion 37, and the first suction side flow passage 73 and the second suction side flow passage 74 which is disposed at the trailing edge side thereof communicate with each other at the return portion 39 of the root 38.

In the central part of the intermediate portion 33, the pressure side flow passages 68 and the first suction side flow passages 73 communicate each other at the return portions 39 of the leading portion 37, and the first suction side flow passages 73 and the second suction side flow passages 74 which are disposed at the leading side communicate with each other at the return potions 39.

In the rear part of the intermediate portion 33, the pressure side flow passage 68 and the first suction side flow passage 73 communicate with each other at the return portion 39 of the leading portion 37 and the first suction side flow passage 73 and the two second suction side flow passages 74 which are disposed at its leading side and at its trailing side communicate with each other at the return portion 39 of the root 38.

Film holes 48 are formed in the suction side blade surface 46 at the suction side flow passages 68 and in the pressure side blade surface 47 at the pressure side flow passages 74. Jet holes 53 are formed in the leading portion 37 at the first suction flow passages 73 and the second suction flow passages 74. A great number of projecting ribs 64 are formed on the inner wall surfaces of the pressure side flow passages 68 and the first suction flow passages 73.

The pressure medium supplied from the inner side root 38 is distributed to the leading portion 32, the intermediate portion 33 and the trailing portion 34 and flows therethrough.

In the intermediate portion 33, the supplied cooling medium flows through the pressure side passage 68 in the radial outward direction. It returns at the return portion 39 of the leading portion 37 and flows through the first suction side passage 73 in the radial inward direction. It further returns at the return portion 39 of the root 38 and flows through the second suction side flow passage 74 in the radial outward direction. Part of the cooling medium is discharged from the film holes 48 to perform film cooling, and the other part of the cooling medium is discharged into the main flow through the jet holes 53.

Similarly to the second embodiment, the cooling flow passages are divided by the partitions 66 and 72 which are parallel with the blade rotating direction R. The heat transmitting ratio increasing effect due to a Coriolis force is used without loss in the pressure side flow passages 68 and the first suction side flow passages 73 divided by vertical partition walls 67, and high internal heat transmission is performed.

A fourth embodiment of a cooled turbine blade according to the present invention will described with reference to FIGS. 12 and 13. FIG. 12 is a longitudinal cross-sectional view of the cooled turbine blade and FIG. 13 is an enlarged perspective view of a turbulent promoter.

Figure 13:
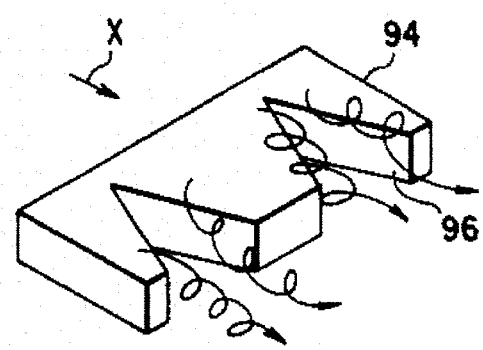
FIG. 13 is a perspective view of the fourth embodiment.

In FIGS. 12 and 13, the cooling medium supplied from the root 83 in the leading portion 82 of the cooled turbine blade 81 flows through cooling flow passages 84 extending in the span direction so as to perform impingement cooling. In a leading edge 85 are formed shower heads 86 for performing film cooling.

A return flow passage 87 and pin fins 88 perform enforced convection cooling in the range of the blade from the intermediate portion to the trailing edge. The cooling medium flows through a cooling flow passage 89 and then passes through the return flow passage 87 formed parallel therewith at the trailing edge side.

Thereafter, the cooling medium passes through orifices 91 formed in the wall surface of the final flow passage 90 and flows into a trailing portion 92 formed with the pin fins 88. The cooling medium flowing into the trailing portion 92 performs convention cooling at the pin fins 88 and then is discharged from the trailing edge 93.

Projecting ribs 94 and 95 of turbulence promoters as cooling members are provided on the inner wall surfaces of the cooling flow passage 84 in the leading portion 82, the return flow passage 87 and the cooling flow passage 89 in the range of the blade from the intermediate portion to the trailing edge and the final flow passage 90. The projecting ribs 94 and 95 are perpendicular to the flow direction X of the cooling medium and separated from each other at predetermined intervals in the flow direction X. Each rib has a rectangular shape extending in the flow direction X and triangular notches 96 cut in from the downstream side are formed in the rear portion of the rib.

The cooling medium is first separated from the ribs 94 and 95 at their front edges. Then, the cooling medium separated from the upper edges of the notches 96 formed in the rear portions of the ribs forms longitudinal vortexes and is discharged. The separated flow of the cooling medium from the front edges of the ribs and the longitudinal vortexes interfere with each other to produce strong turbulence of the cooling medium. As a result, the heat transmitting ratio in the cooling flow passages 84 and 89 and the passages 87 and 90 is improved, and the inner wall surfaces on which the ribs 94 and 95 are cooled efficiently.

The ribs 94 and 95 are provided in such a way that the notches 96 of the adjacent ribs 94 are arranged in a staggered fashion. This arrangement causes the longitudinal vortexes produced at the upper edges of the notches 96 to be dispersed and discharged in the width direction. This can enhance the heat transmitting ratio over the substantial whole region of the interior of the cooling flow passages 84 and 89 and the flow passages 87 and 90, and the inner wall surfaces on which the ribs 94 and 95 are provided are cooled efficiently.

In this embodiment, one or two notches 96 are formed in each rib 94, 95. However, the number of the notches 96 and their shape are not limited to the ones of this embodiment. The notches 96 are formed at the downstream side of the main flow of the cooling medium in this embodiment, but may be formed at the upstream side because longitudinal vortexes are produced in both cases.

Figure 14:
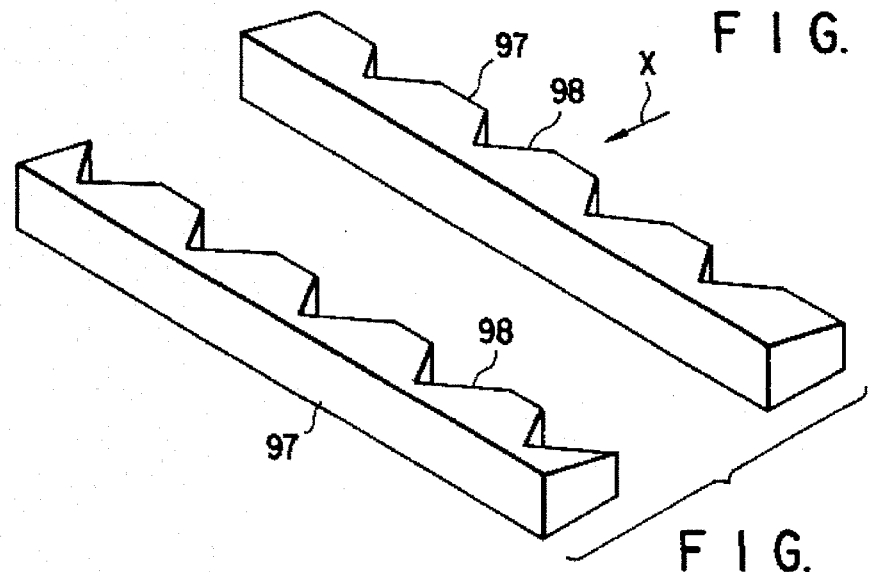
FIG. 14 is a perspective view of a turbulence promoter of a fifth embodiment of the present invention.

A fifth embodiment will be described with reference to FIG. 14 which is a perspective view. As shown in FIG. 14, ribs 97 of turbulence promoters as cooling members has a trapezoidal form extending the flow direction X of the cooling medium. Similarly to the fourth embodiment, triangular notches 97 are cut in the upstream side of the rib and are arranged at predetermined intervals in the flow direction X.

The notches 98 are arranged so that their upper edges are inclined at an angle of attack with respect to the flow of the cooling medium and many vortexes are produced at the edges of the notches 98. Thus, notches 98 provide strong convention cooling effect, and a cooled member (not shown) provided with the ribs 97, such as a cooled turbine blade formed with flow passages of the cooling medium, can be cooled efficiently.

The notches 98 are arranged in a staggered fashion along the flow direction X of the cooling medium when a plurality of ribs 97 are provided in the cooled member. This arrangement performs cooling more effectively. The ribs 97 are not always required to have the same height as viewed from the flow direction X as shown in FIG. 14. The size and the shape of the notch 98 are not always limited to the ones as shown in FIG. 14.

Figure 15:
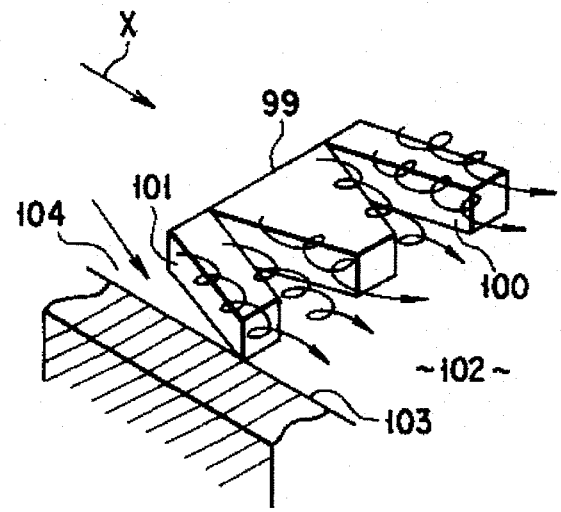
FIG. 15 is a perspective view of a turbulence promoter of a sixth embodiment of the present invention.

A sixth embodiment will be described with reference to FIGS. 15 and 16. FIG. 15 is its perspective view and FIG. 16 is a perspective view showing arrangement of a modification.

As shown in FIG. 15, each rib 99 of a turbulence promoter as a cooling member has a rectangular shape extending in the flow direction X of the cooling medium and has two triangular notches 100 formed at the downstream side similarly to the rib of the fourth embodiment. The rib 99 has both end surfaces 101 inclined at a predetermined angle with respect to the flow direction X of the cooling medium.

When the ribs 99 are provided in a flow passage 102 of the cooling medium in a cooled member such as a cooled turbine blade, gaps 104 defined between the end surfaces 101 and flow passage walls 103 are made narrower at the downstream side. The flow of the cooling medium separated from the upper edge of each notch 100 forms longitudinal vortexes and is discharged. The separated flow from the front edges of the ribs and the longitudinal vortexes interfere with each other to produce strong turbulence of the cooling medium. Since not only further longitudinal vortexes are produced at both end surfaces 101 are produced but also the cooling medium is accelerated, the convention cooling effect in the flow passage 102 of the cooling medium can be further enhanced thereby cooling the cooled turbine blade efficiently.

Figure 16:
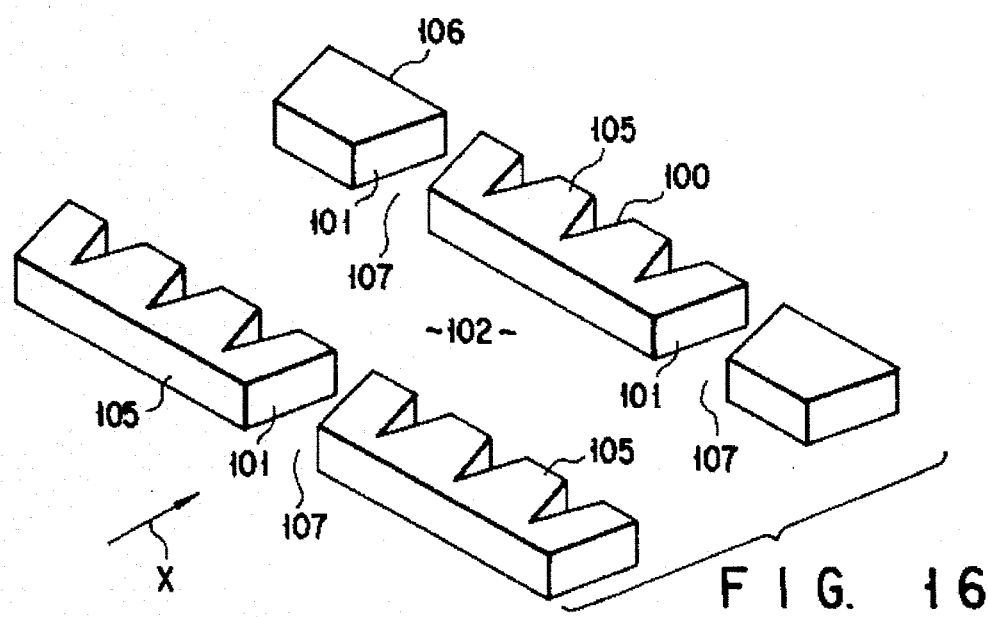
FIG. 16 is a perspective view showing how to arrange the turbulence promoters.

As shown in FIG. 16, rows of the ribs crossing the flow passage 102 are arranged at predetermined intervals in the flow direction X. Some rows of the ribs each comprise ribs 105 each having three triangular notches 100 similar to those of the rib 99, and the other rows of ribs 106 have no notches. Both rows of notches are arranged alternately. The surfaces of both end portions 101 of the ribs 105 and 106 are inclined at a predetermined angle with respect to the flow direction X of the cooling medium and the downstream side of each rib is narrower than its upstream side.

A gap 107 between the ribs 105 and 106 is formed narrower in the flow direction X of the cooling medium.

Thus, production of the longitudinal vortexes at both end surfaces 101 of the ribs 105 and 106 acceleration of the cooling medium passing through the gap 107 between the ribs 105 and 106 cooperate to perform effective convention cooling, and the cooled member such as a cooled turbine blade, which forms the flow passage 102, can be cooled efficiently. The staggered arrangement of the notches 100 in the flow direction X of the cooling medium allows for effective convection cooling.

Figure 17:
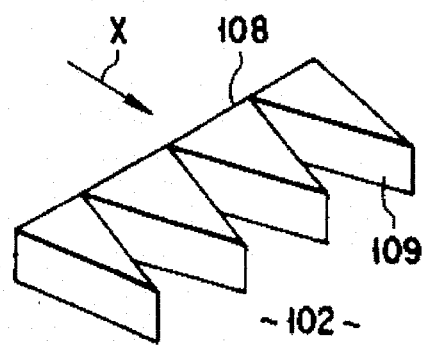
FIG. 17 is a perspective view of a turbulence promoter of a seventh embodiment of the present invention.

A seventh embodiment will be described with reference to FIG. 17 which is a perspective view. As shown in FIG. 17, a rib 108 of a turbulence promoter as a cooling member has a rectangular shape extending in the flow direction X of the cooling medium, and saw-toothed notches 109 are formed from the rear portion of the rib 108.

When the notches 109 are disposed in a flow passage 102 through which the cooling medium flows, many longitudinal vortexes are formed at the edges of the notches 109 in the same way as the ribs of the fourth embodiment and strong turbulence of the cooling medium is produced. In consequence, the heat transmitting rate can be improved. The notches 108 can be formed in the upstream end portion of the rib 108 and the cut-in angle of the notches 108 and their size are not limited to the ones as shown in FIG. 17.

Figure 18:
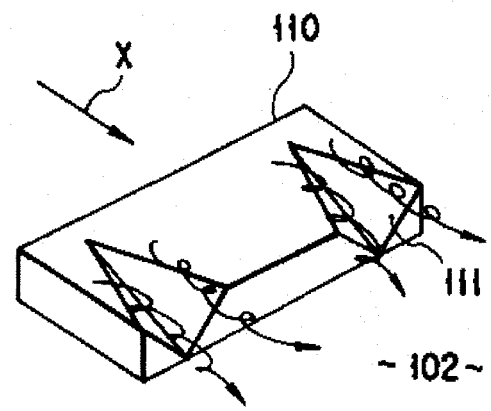
FIG. 18 is a perspective view of a turbulence promoter of an eighth embodiment of the present invention.

An eighth embodiment will be described with reference to FIG. 18 which is a perspective view. As shown in FIG. 18, a rib 110 of a turbulence promoter as a cooling member has a rectangular shape extending in the flow direction X of the cooling medium, and triangular notches 111 are formed from the rear portion of the rib.

When the ribs 110 are provided in a flow passage 102, many longitudinal vortexes are produced at edges of the notches 111 and strong turbulence of the cooling medium is generated similarly to the ribs of the seventh embodiment. In this regard, this embodiment provides the similar effect to that of the seventh embodiment. The notches 111 may be formed in the upstream portion of the rib 110, and the number of the notches 111 and their size are not limited to the ones as shown in FIG. 18.

Figure 19:
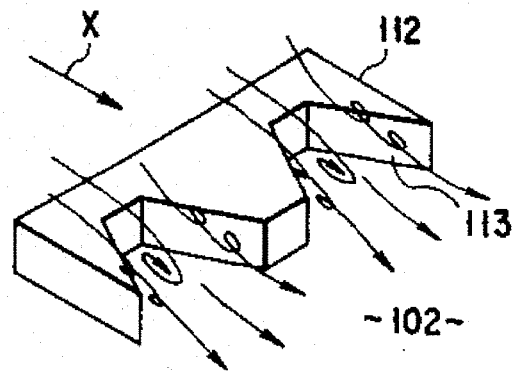
FIG. 19 is a perspective view of a turbulence promoter of a ninth embodiment of the present invention.

The ninth embodiment will be described with reference to FIG. 19 which is a perspective view. As shown in FIG. 19, a rib 112 of a turbulence promoter as a cooling member has a trapezoidal shape extending in the flow direction X of the cooling medium, and trapezoidal notches 113 are formed from the rear portion of the rib.

When the ribs 112 are provided in a flow passage 102, many longitudinal vortexes are produced at edges of the notches 113 and strong turbulence of the cooling medium is generated similarly to the ribs of the seventh embodiment. In this regard, this embodiment provides the similar effect to that of the seventh embodiment. The notches 113 may be formed in the upstream portion of the rib 112, and the number of the notches 113 and their size are not limited to the ones as shown in FIG. 19.

Figure 20:
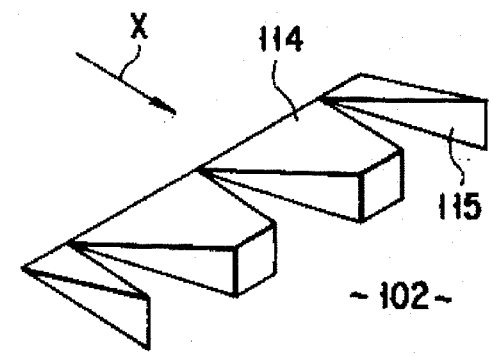
FIG. 20 is a perspective view of turbulence promoters of a tenth embodiment of the present invention.

A tenth embodiment will be described with reference to FIG. 20 which is a perspective view. As shown in FIG. 20, a rib 114 of a turbulence promoter as a cooling member has a triangular cross section extending in the flow direction X of the cooling medium, and triangular notches 115 are formed from the rear portion of the rib.

When the ribs 114 are provided in a flow passage 102 with the front end (the apex of the triangle) of each rib 114 directed toward the flow direction X of the flow passage 102 through which the cooling medium flows, the notches 115 prevent formation of a stagnant area in front of the ribs, whereby pressure loss of the cooling medium can be reduced.

Since the stagnant area is reduced, dust is suppressed from accumulating around the ribs 114 and the cooling property of the cooled member can be prevented from being lowered. Many longitudinal vortexes are produced at the edges of the notches 115, and strong turbulence of the cooling medium is generated in the similar manner to the case of the seventh embodiment. Thus, this embodiment attains the similar effect to that of the seventh embodiment.

When increase of pressure loss and accumulation of dust around the ribs 114 do not come in question, the notches 115 may be formed in the upstream side of each rib, and the number and the size of the notches 115 are not always limited to the ones as shown in FIG. 20.

Figure 21:
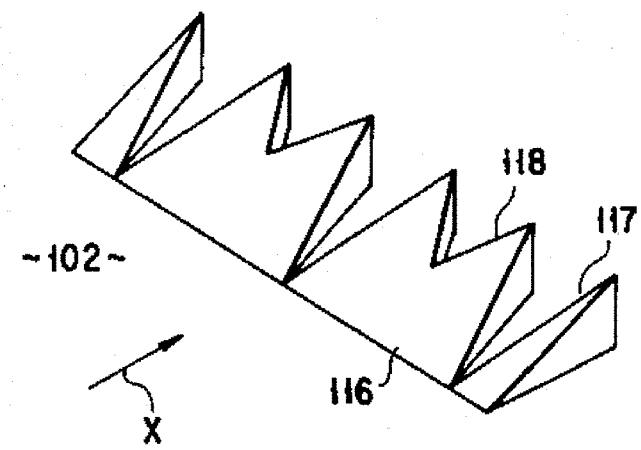
FIG. 21 is a perspective view of turbulence promoters of an eleventh embodiment of the present invention.

An eleventh embodiment will be described with reference to FIG. 21 which is a perspective view. As shown in FIG. 21, each of ribs 116 of a turbulence promoter as a cooling member has a triangular cross section extending in the flow direction X of the cooling medium, and triangular notches 117 and 118 having different sizes are formed from the rear portion of the rib 106.

Since the notches 117 and 118 have different cut-in depths, the heights of edges of the notches at which longitudinal vortexes are produced can be changed. Thus, strong turbulence can be produced by longitudinal vortexes generated at both different widths and different heights, and the convection cooling effect is enhanced.

When increase of pressure loss and accumulation of dust around the ribs 116 are not questioned, the notches 117 and 118 may be formed in the upstream side of each rib, and the number and the size of the notches are not always limited to the ones as shown in FIG. 21.

Figure 22:
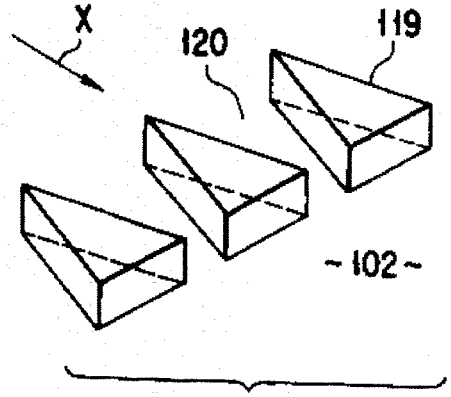
FIG. 22 is a perspective view of turbulence promoters of a twelfth embodiment of the present invention.

A twelfth embodiment will be described with reference to FIG. 22 which is a perspective view. As shown in FIG. 22, each of ribs 119 of a turbulence promoter as a cooling member has a triangular prism shape. The ribs 119 are arranged in a flow passage 102 with a gaps 120 provided between the adjacent ribs 119 and with the apexes thereof directed toward the downward side.

The cooling medium is separated from the edges of the ribs 119 and forms many longitudinal vortexes in the cooling medium whereby strong turbulence is produced in the cooling medium. In this way, the heat transmission rate can be enhanced in the flow passage 102. As the downstream side of the gap 119 with respect to the flow direction X of the cooling medium is narrower than the upstream side of the gap 119, the cooling medium passing through the gaps between the ribs 119 is accelerated to perform effective convection cooling.

In this embodiment, a stagnant area in front of the ribs 119 is decreased. Thus, pressure loss of the cooling medium is reduced. A stagnant portion in the flow passage 102 is also reduced. Therefore, accumulation of dust around the ribs 119 can be suppressed and lowering of the cooling capacity of the member can be prevented.

In FIG. 22, the triangular prism shaped ribs 119 are arranged in a row. However, it is more preferable that ribs 119 be arranged in a staggered fashion with respect to the flow direction of the cooling medium. The size and the shape of the ribs 119 are not always limited to the ones as shown in FIG. 22. The ribs having different sizes can be used instead. When the triangular prism shaped ribs are cut slantwise, longitudinal vortexes can be produced more effectively and heat transfer in the flow passage 102 is more improved.

Figure 23:
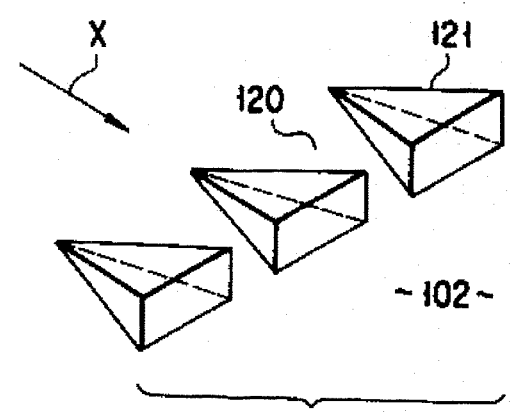
FIG. 23 is a perspective view of turbulence promoters of a thirteenth embodiment of the present invention.

A thirteenth embodiment will be described with reference to FIG. 23 which is a perspective view. As shown in FIG. 23, each of ribs 121 of a turbulence promoter as a cooling member has a triangular wedge shape. The ribs 121 are arranged with their apexes directed toward the upstream side so that gaps 120 are formed between the adjacent ribs 121 in the flow passage 102 through which the cooling medium flows. This structure provides the similar effect to that of the twelfth embodiment.

Figure 24:
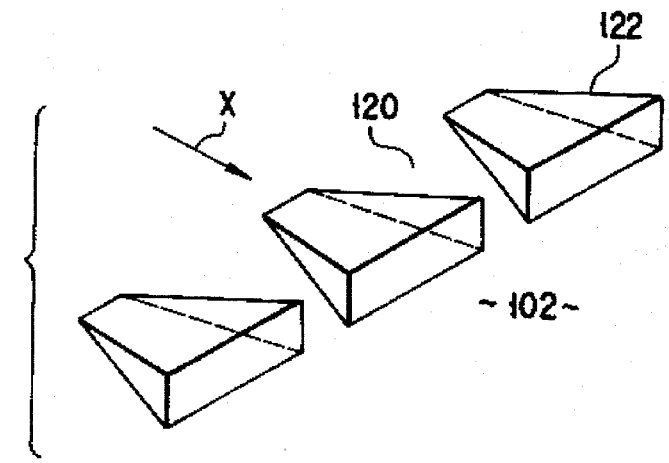
FIG. 24 is a perspective view of turbulence promoters of a fourteenth embodiment of the present invention.

A fourteenth embodiment will be described with reference to FIG. 24 which is a perspective view. As shown in FIG. 24, each of ribs 122 of a turbulence promoter as a cooling member has a rectangular wedge shape. The ribs 122 are arranged with their apexes directed toward the upstream side so that gaps 120 are formed between the adjacent ribs 122 in the flow passage 102 through which the cooling medium flows. This structure provides the similar effect to that of the twelfth embodiment.

Figure 25:
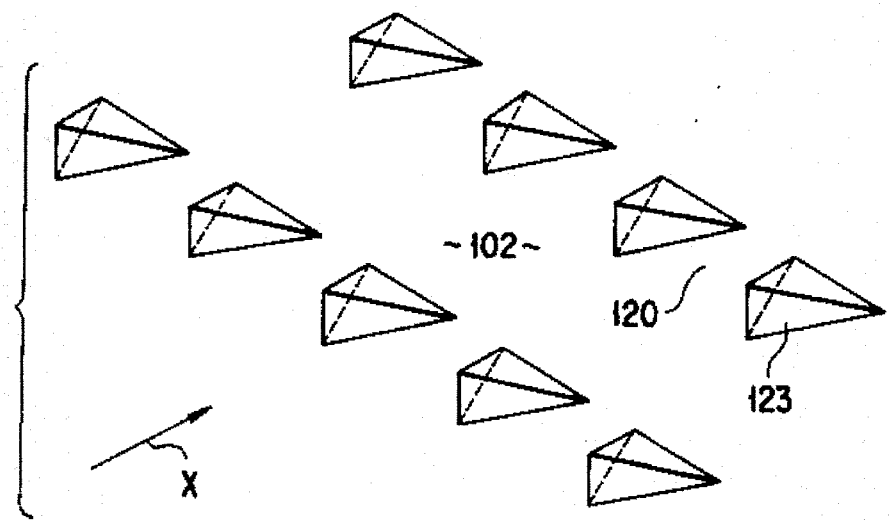
FIG. 25 is a perspective view of turbulence promotes of a fifteenth embodiment of the present invention.
Figure 31:
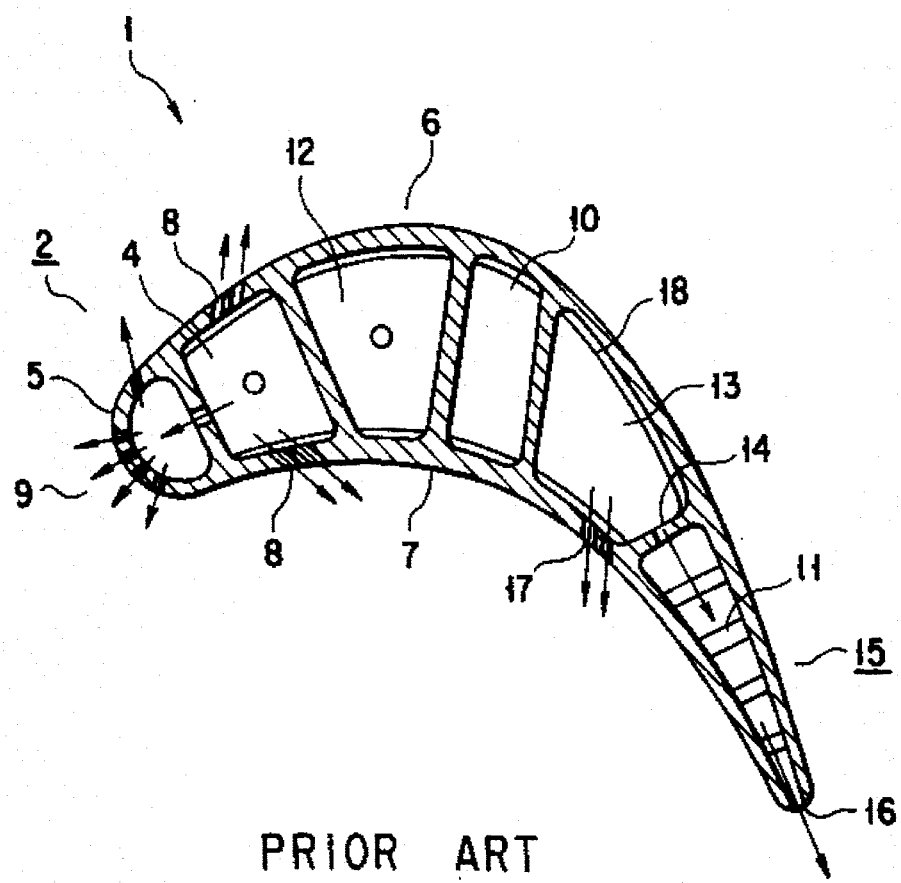
FIG. 31 is a transverse cross-sectional view of a first prior art turbine blade.
Figure 32:
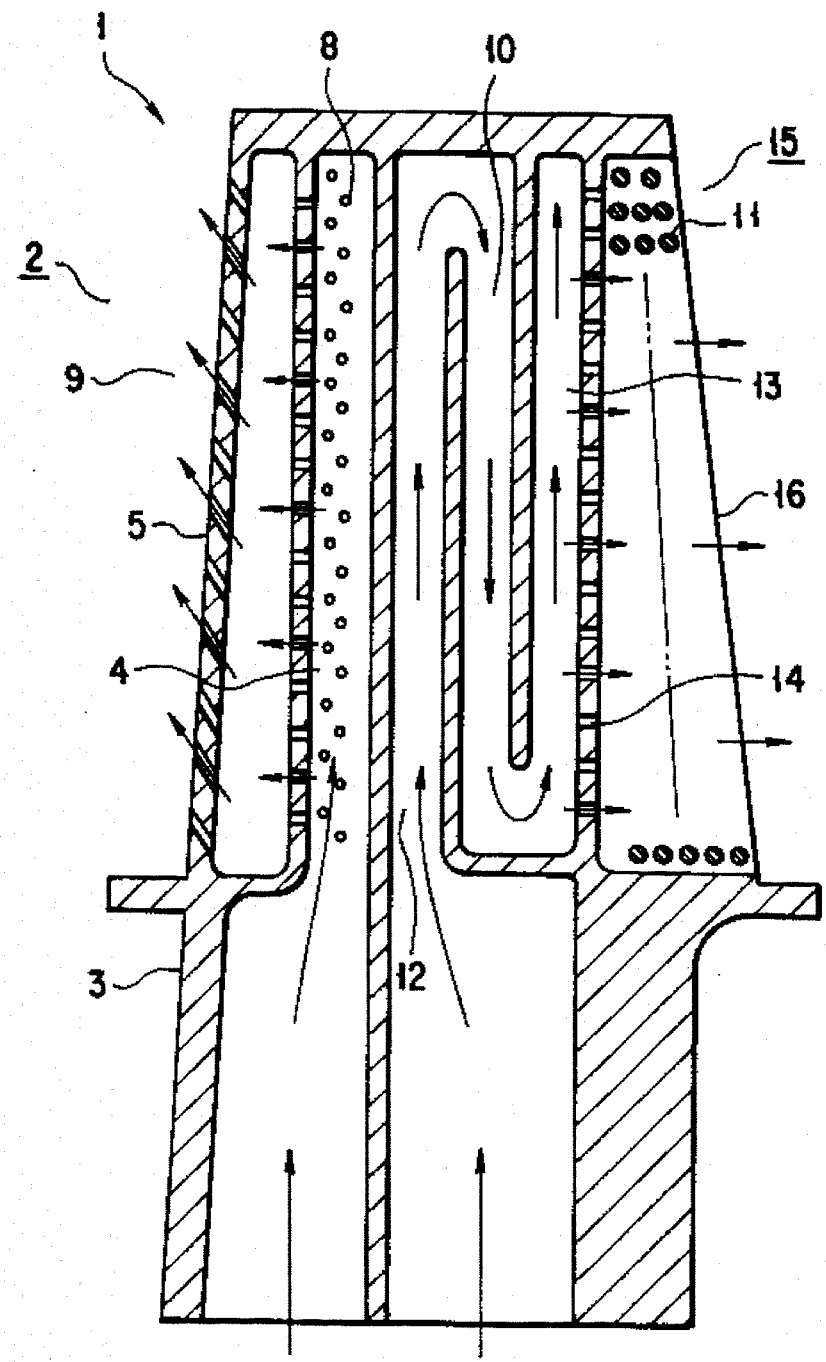
FIG. 32 is a longitudinal cross-sectional view of the first prior art turbine blade.
Figure 33:
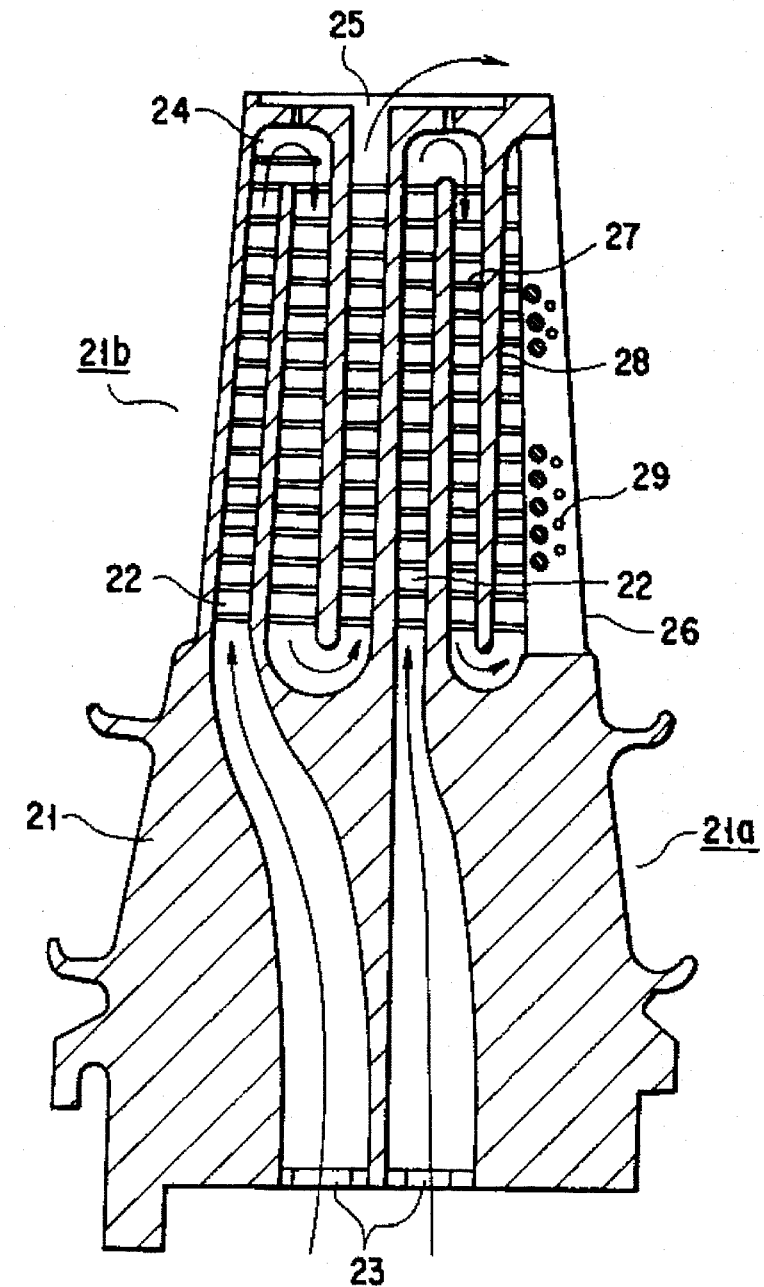
FIG. 33 is a longitudinal cross-sectional view of a second prior art turbine blade.
Figure 34:
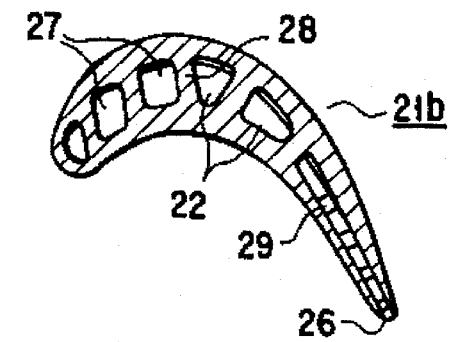
FIG. 34 is a transverse cross-sectional view of the second prior art turbine blade.

A fifteenth embodiment will be described with reference to FIG. 25 which is a perspective view. As shown in FIG. 25, each of ribs 123 of a turbulence promoter as a cooling member has a tetrahedral wedge shape. The ribs 121 are arranged with their apexes directed toward the upstream side so that gaps 120 are formed between the adjacent rows of ribs 121. This structure provides the similar effect to that of the twelfth embodiment. As shown, the ribs 123 are arranged in a staggered fashion with a predetermined space left in the flow direction X of the cooling medium so as to perform effective convection cooling.

A sixteenth embodiment will be described with reference to FIG. 26 which is a perspective view. As shown in FIG. 26, each of ribs 124 of a turbulence promoter as a cooling member has a triangular wedge shape. The ribs 124 are arranged with their apexes directed toward the upstream side so that gaps 120 are formed between the adjacent ribs 124. A triangular prism shaped notch 125 is formed in the rear portion of the rib 124. This structure provides the similar effect to that of the twelfth embodiment. In place of triangular wedge shaped ribs 124, the ribs of the twelfth to fourteenth embodiments can be used.

A seventeenth embodiment will be described with reference to FIG. 27 which is a perspective view. As shown in FIG. 27, a rib 126 of a turbulence promoter as a cooling member has a streamlined cross section extending in the flow direction x of the cooling medium.

When the ribs 126 are provided in a flow passage 102 through which the cooling medium flows, many longitudinal vortexes are produced and strong turbulence of the cooling medium is generated. Thus, this embodiment provides the similar effect to the seventh embodiment.

An eighteenth embodiment will be described with reference to FIG. 28 which is a perspective view. As shown in FIG. 28, a rib 127 of a turbulence promoter as a cooling member has a streamlined cross section extending in the flow direction X of the cooling medium. A triangular prism shaped notch 128 is formed in the rear portion of each rib 127.

When the ribs 127 are set in a flow passage 102, many longitudinal vortexes from the edges of the notches 128 are conducted along the surfaces of the ribs 127 similarly to the ribs of the seventh embodiment to produce strong turbulence of the cooling medium. In this regard, this embodiment gives the similar effect to the seventh embodiment.

Each of the turbulence promoters as shown in FIGS. 12 to 28 has a notch or notches, or a projection or projections. The projection or notch of each turbulence promoter inclines to the flow of the cooling medium. A longitudinal vortex is therefore generated at the projection or the notch, deflecting the flow of the cooling medium such that the medium collides against the inner surface of the cooling flow passage. This increases the cooling efficiency. Furthermore, the turbulence promoters produces longitudinal vortexes similar to those generated by the above-mentioned Coriolis force. Since the longitudinal vortexes produced by the turbulence promoters do not interfere with one another, they do not adversely influence the cooling efficiency.

The projections or the projections are not limited to triangular ones. They may have whatever shape, provided that they have an edge which inclines at an angle to the flow of the cooling medium and that a longitudinal vortex is generated at that edge.

The cooling means for improving the cooling efficiency by the turbulence promoters as described above is applicable to the other apparatuses. For example, the amount of heat to be transmitted per unit area of a large scale integrated semiconductor element is extremely large and sometimes amounts to that produced from a cooled turbine blade. In such a case, the similar cooling means to that used in the turbine blade is applicable to cool the semiconductor element. Embodiments thereof will be described with reference to FIGS. 29 and 30.

A nineteenth embodiment will be described with reference to FIG. 29 which is a perspective view. As shown in FIG. 29, a large scale integrated (LSI) semiconductor device generating a large amount of heat is designated at 129. On the outer surface of its package 130 are provided ribs 131 and 132 of a turbulence promoter as a cooling member.

Each of the ribs 131 and 132 has a triangular cross section extending in the arranged direction of the ribs. The rib 131 has two notches 133 and the rib 132 has a notch 133. The notch 133 is formed from the upper edge of each rib. The ribs 131 and 132 are provided at predetermined intervals in the above-mentioned arranged direction so that the notches 133 are arranged in a staggered fashion. Outer leads are designated at 134.

The semiconductor device 129 is mounted on a substrate and assembled in an electronic apparatus (not shown) in such a way that the direction of the arrangement of the device 129 coincides with the flow direction X of the cooling medium, i.e., the front ends (the apexes of the triangular ribs) are directed toward the upstream side. The device 129 operates in a normal way while being cooled by a cooling medium flowing through the electronic device.

Many longitudinal vortexes are produced at the edges of the notches 133 of the ribs 131 and 132 in the flowing cooling medium and strong turbulence of the cooling medium which provides strong convention cooling effect. The improved heat transmitting ratio allows for effective cooling of the semiconductor device 129.

Since no stagnant area is produced in front of the ribs 131 and 132, the pressure loss of the cooling medium can be reduced. This can reduce accumulation of dust around the ribs 131 and 132 and can prevent lowering of the cooling ability.

When increase of pressure loss and accumulation of dust around the ribs 131 and 132 are not questioned, the notches 133 may be formed in the upstream side of each rib, and the number and the size of the notches are not always limited to the ones as shown in FIG. 29.

A twentieth embodiment will be described with reference to FIG. 30 which is a perspective view. As shown in FIG. 30, a large scale integrated (LSI) semiconductor device generating a large amount of heat is designated at 135. On the outer surface of its package 136 are provided projecting ribs 137 of a turbulence promoter as a plurality of cooling members.

Each of ribs 137 has a triangular prism shape. They are arranged with their apexes directed in the same directions. Gaps 138 are provided between adjacent longitudinal rows of the ribs 137 in a staggered fashion.

The semiconductor device 135 is mounted on a substrate and assembled in an electronic apparatus (not shown) in such a way that the direction of the longitudinal arrangement of the ribs 137 in a staggered fashion coincides with the flow direction X of the cooling medium, i.e., the apexes of the triangular ribs 137 are directed toward the upstream side. The device 135 operates in a normal way while being cooled by a cooling medium flowing through the electronic device.

The cooling medium is separated from the edges of the ribs 137 in the flowing cooling medium, and the separated flow forms many longitudinal vortexes. Strong turbulence of the cooling medium is generated to provide strong convection cooling effect. Thus, the heat transmitting ratio is improved. Since the gaps 138 are narrowed toward the downstream side, the cooling medium passing through the spaces between the ribs 137 is accelerated. This results in more effective convention cooling. Therefore, the semiconductor device 135 is cooled effectively.

Since no stagnant area is produced in front of the ribs 137, the pressure loss of the cooling medium can be reduced, and accumulation of dust around the ribs 137 is also reduced. Thus, lowering of the cooling ability is prevented.

The size and the shape of the ribs 137 is not always limited to the ones as shown in FIG. 30 but combination of ribs having various size and/or shape can be used. When slantwise cut triangular prism shaped ribs are used, they produce more effective longitudinal vortexes. Thus, more improved heat transmission can be performed.

The present invention is not limited to the above-mentioned embodiments and modifications. It is possible to combine these embodiments and modifications. The present invention is applicable to any other embodiments within its scope.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A cooled turbine blade provided on a turbine rotor of a gas turbine including pressure side cooling flow passages and suction side cooling flow passages extending in a span direction and formed in said gas turbine blade, said pressure side cooling flow passages and said suction side cooling flow passages being connected together to form a series cooling flow passage assembly, said pressure side cooling flow passages conducting a cooling medium in a direction from a root of said turbine blade toward a tip portion of said turbine blade, said suction side cooling flow passages conducting said cooling medium in a direction from said tip portion of said turbine blade toward said root of said turbine blade, said turbine blade comprising:

at least one of said suction side cooling flow passages forming the most downstream cooling flow passage;

said most downstream cooling flow passage having a root side end portion communicating with a root side end portion of one of said suction side cooling flow passages which is at an upstream side of said most downstream cooling flow passage, said cooling medium flowing from said tip portion toward said root in said suction side cooling flow passage at said upstream side of said most downstream cooling flow passage, and flowing from said root toward said tip portion in said most downstream cooling flow passage; and said most downstream suction side cooling flow passage communicating with an outside of said turbine blade through film cooling nozzles, for exhausting said cooling medium flowing from said root toward said tip portion in said most downstream flow passage through said nozzles.

2. A cooled turbine blade according to claim 1, wherein said number of said suction side cooling flow passages is larger by at least one than said number of said pressure side cooling flow passages.

3. A cooled turbine blade according to claim 1, wherein said number of said suction side cooling flow passages is larger by two than said number of said pressure side cooling flow passages, and two of said suction side cooling flow passages forms said most downstream cooling flow passage.

4. A cooled turbine blade according to claim 2 or claim 3, wherein a cross sectional area of said most downstream flow passage is smaller than a cross sectional area of the other cooling flow passages.

5. A cooled turbine blade according to claim 1, wherein an interior of said turbine blade is divided into a plurality of sections arranged in a chord direction of said turbine blade by a plurality of partitions substantially parallel with a rotational direction of said turbine rotor and said sections are divided into said pressure side cooling flow passages and said suction side cooling flow passages by partition walls substantially perpendicular to said rotational direction of said turbine rotor.

6. A cooled turbine blade according to claim 1, wherein each of said cooling flow passages has an inner wall surface provided with at least one projecting turbulence promoter which has a projection or a notch having an edge inclining to a flow of the cooling medium, and a vortex is produced at the edge of the projection or notch, said vortex having an axis parallel to the flow of the cooling medium.

7. A cooled turbine blade according to claim 6, wherein said turbulence promoter comprises a rib having at least one triangular notch.

8. A cooled turbine blade according to claim 6, wherein said turbulence promoter comprises a triangular projection.

\* \* \* \* \*